United States Patent
Collins

(10) Patent No.: US 10,180,823 B2
(45) Date of Patent: Jan. 15, 2019

(54) SYSTEMS AND METHODS FOR BUILDING APPLICATIONS USING BUILDING BLOCKS LINKABLE WITH METADATA

(71) Applicant: Oracle International Corporation, Redwood Shores, CA (US)

(72) Inventor: Keith Collins, White Salmon, WA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 15/399,560

(22) Filed: Jan. 5, 2017

(65) Prior Publication Data

US 2018/0081639 A1 Mar. 22, 2018

Related U.S. Application Data

(60) Provisional application No. 62/395,892, filed on Sep. 16, 2016.

(51) Int. Cl.
*G06F 9/44* (2018.01)
*G06F 8/34* (2018.01)

(52) U.S. Cl.
CPC ...................... *G06F 8/34* (2013.01)

(58) Field of Classification Search
CPC ........................................................ G06F 8/34
See application file for complete search history.

(56) References Cited

U.S. PATENT DOCUMENTS

| 5,613,111 | A | * | 3/1997 | Malatesta | ......... | G06F 17/30569 |
| 7,584,207 | B2 | | 9/2009 | Mortensen et al. | | |
| 7,721,259 | B2 | | 5/2010 | Heinke et al. | | |
| 8,103,641 | B2 | | 1/2012 | Baskaran et al. | | |
| 8,752,015 | B2 | | 6/2014 | Basak et al. | | |
| 8,966,465 | B2 | | 2/2015 | Konduri | | |
| 9,052,978 | B2 | | 6/2015 | Appadurai | | |
| 2001/0037494 | A1 | * | 11/2001 | Levien | ...................... | G06F 8/20 717/141 |
| 2003/0221184 | A1 | | 11/2003 | Gunjal et al. | | |

(Continued)

OTHER PUBLICATIONS

Wikman, Eric, "Creating Upgrade-Safe Customizations", Epicom Blog, Jan. 2, 2009.

(Continued)

*Primary Examiner* — Chameli Das
(74) *Attorney, Agent, or Firm* — Kilpatrick Townsend & Stockton, LLP

(57) ABSTRACT

Systems and methods relate to creating applications using building blocks linked together with metadata. A user interface can enable a user to create an application. Creating the application can include defining a new building block configured to generate output data. The new building block can include one or more existing building blocks and the metadata associated with the existing building blocks. For example, a building block can include at least one input/output (I/O) feature configured to receive inputs and/or generate outputs. Further, the existing building block can correspond to a data structure including external I/O features. The new building block can be linked to an existing building block by mapping an external I/O feature of the existing building block to an open I/O feature of the new building block. The mapping can be stored in metadata associated with the new building block.

15 Claims, 12 Drawing Sheets

(56) References Cited

U.S. PATENT DOCUMENTS

| | | | |
|---|---|---|---|
| 2005/0038942 A1* | 2/2005 | Swanson | G01R 23/167 710/72 |
| 2006/0144010 A1* | 7/2006 | Wolf | G06F 8/20 52/750 |
| 2007/0203956 A1 | 8/2007 | Anderson et al. | |
| 2008/0276218 A1 | 11/2008 | Taylor et al. | |
| 2009/0064090 A1 | 3/2009 | Anonsen et al. | |
| 2010/0223597 A1* | 9/2010 | Jain | G06F 17/30489 717/127 |
| 2010/0325085 A1* | 12/2010 | Stritzel | G06F 8/60 707/609 |
| 2012/0266063 A1 | 10/2012 | Bushnell | |
| 2014/0282367 A1* | 9/2014 | Harrill | G06F 8/31 717/105 |
| 2015/0113499 A1 | 4/2015 | Sharma et al. | |
| 2016/0283200 A1* | 9/2016 | Standley | G06F 8/34 |
| 2016/0321040 A1* | 11/2016 | Sankaranarasimhan | G06F 3/0484 |
| 2017/0003843 A1* | 1/2017 | Liao | G06F 3/048 |
| 2018/0081640 A1 | 3/2018 | Collins et al. | |

OTHER PUBLICATIONS

Hick, et al., "Using Meta-Data to Support Customization", 1999.
"Oracle Fusion Applications", Extensibility for Developers, 11g Release 8 (11.1.8) Refresh 5, Jun. 2014.

* cited by examiner

URI Mapping

Layout Name QE_FlightTest

Mapping Layouts [Maintenance Records ▼] — 710

Available Layout URIs — 720

| Select | Description |
|---|---|
| ☐ | Default initialization – no parameters required |
| ☐ | A/C Number |
| ☑ | Pilot Name |
| ☐ | Flight Test Destination |

URI Elements Requiring Mapping

Pilot
 Constant ☐
 Primitive ☐          Name <Not Mapped>
 Select Primitive
                    — 730

Available Primitives — 740

Pilot 750
Aircraft Number
Squadron
Aircraft Type
Flight Test Destination
MSI
ECM
Comm1

Layouts - Search           <u>900</u>

Layout Name CUSTOM_APP
Description Customization for Parent

Event Details

Event Type SAVE
Root Package ID QE_FLIGHTPLAN_SYNC
Path :
Class ID PARENT
Method OnSaveEvent        <u>910</u>

*Custom*

Root Package ID QE_FLIGHTPLAN_SYNC
Path :
Class ID CUSTOM
Method OnCustomSaveEvent        <u>920</u>
<u>950</u> ☑ Custom Event Only Event Type INIT
Root Package ID QE_FLIGHTPLAN_SYNC
Path :
Class ID PARENT
Method OnInitEvent        <u>930</u>

*Custom*

Root Package ID QE_FLIGHTPLAN_SYNC
Path :
Class ID CUSTOM
Method OnCustom        <u>940</u>
☐ Custom Event Only

FIG. 9

SYSTEMS AND METHODS FOR BUILDING APPLICATIONS USING BUILDING BLOCKS LINKABLE WITH METADATA

CROSS REFERENCE TO RELATED APPLICATIONS

This application claims the priority benefit of U.S. Provisional Application No. 62/395,892, filed on Sep. 16, 2016, the disclosure of which is herein incorporated by reference in its entirety for all purposes.

FIELD

The present disclosure relates generally to building applications. More specifically, the present disclosure relates to building applications using building blocks that are linkable with customizable metadata.

BACKGROUND

Generally, users have increasingly been customizing applications created by application providers (e.g., applications created by PEOPLESOFT™). However, customizations performed by users are problematic. For instance, if the application is modified by the application provider (e.g., upgraded or patched), the customizations performed by the user to the application are overridden. Users often generate and review reports to determine how the look and feel has changed or other customized settings have been lost after the application is modified. Users may have to re-customize the application to achieve the look and feel and customized settings they prefer. This process can be very complex and burdensome due to the number of changes in the customization.

SUMMARY

Certain aspects and features of the present disclosure relate to systems and methods for creating applications using building blocks that can be linked together with metadata. In one embodiment, a user interface can be provided to enable a user to create an application. Creating the application can include defining a new building block configured to generate output data. To generate the output data, the new building block can include one or more existing building blocks and the metadata associated with the existing building blocks. For example, a building block can include a portion of code (e.g., executable logic) that corresponds to at least one input/output (I/O) feature configured to receive inputs and/or generate outputs. Further, the building block can correspond to a data structure including external I/O features. The external I/O features can include inputs that are defined for storage to the data structure and/or outputs that are defined for retrieval from the data structure. The new building block can be linked to an existing building block by mapping an I/O feature of the existing building block to an open I/O feature of the new building block. The mapping can be stored in metadata associated with the new building block, such that when the new building block is accessed at a later time, the metadata indicates that the open I/O feature is linked to the I/O feature of the existing building block.

In another embodiment, the I/O features of previously defined building blocks can be selectable from a menu object (e.g., a drop down menu). For example, the menu object can be dynamically generated in response to a detection of a request to build a new building block. In response to detecting the request, the menu object can display a list of existing building blocks, such that the I/O features of the displayed building blocks are the types of I/O features that are compatible with the open I/O feature of the new building block. The list of existing building blocks displayed can be dynamically updated (e.g., each time a list is requested for use in building a new building block or connecting to an existing building block, the list is determined by determining, at that time, a collection of then-available building blocks and/or their I/O features and populating the list based on the collection), such that the list of previously-defined building blocks grows as more building blocks are defined. For example, the new building block, along with the metadata associated with the new building block, becomes available for selection using the menu object when the new building block is registered.

In another embodiment, the building blocks may be called as web services (e.g., a representational state transfer (REST) service) that can be interacted with either inside of a building block architecture or outside of the building block architecture using exposed protocols. A REST service is an architectural style for networked applications. For example, the building block can be combinable with other building blocks within the building block architecture that exposes one or more particular other building blocks that are not exposed using web services. In this embodiment, a building block can be transformed into a machine-readable description language (e.g., a web application description language (WADL), a web service description language (WSDL), etc.) that can be modified and/or called using a URI. In an embodiment, the building block architecture can include a PEOPLESOFT™ platform.

In another embodiment, a single-click user interface (UI) tool (e.g., a checkbox feature) can be provided on the user interface. The single-click UI tool can facilitate toggling between unselected and selected based on a single item of user input (e.g., a single click, a single tap, a single swipe, or a single keypress) received at a building block configuration interface. In some instances, the toggling causes switching between customization modes. For example, in a first mode (e.g., when the checkbox feature is unselected), the rendering object associated with an existing building block is executed at runtime without executing any customized metadata. In this example, when in the first mode, the delivered application without any customizations is executed at runtime. In some instances, the toggling causes switching between using another building block and then customizing based on metadata on top of a (single) rendering object (customized with metadata) (e.g., a first mode), or copying another building block and creating a custom building block that generates its own rendering object (natively custom) (e.g., a second mode), when referencing an existing building block from a new building block. In some instances, a delivered application can correspond to an original application class created by the application provider. A user can customize the delivered application by creating a new application class, which includes customized metadata to be applied to the delivered application. In these instances, at runtime, the output data and the associated metadata that is generated from executing the original application class is stored as a rendering object and is used as input to the new application class. Advantageously, the output data and the associated metadata generated from the original application class can be selectively customized (e.g., overridden) by metadata of the new application class without modifying the original application class or metadata of the delivered application. As only a non-limiting example, if executing the original application class generates a table of 20 columns and 4 rows, the new application class can be coded to select some or all of the data in the table or to extend the table to 25 columns. In this example, the metadata included in the new application class can override the metadata stored in the rendering object (from the original application class). In some instances, only the new application class is executed. In these instances, when a particular mode is selected by the user, the original application class is not executed, but rather, only the new application class is executed, thereby generating the data structure coded in the new application class. It will be appreciated that an application class can be associated with an event (e.g., a save event, an initialization event, etc.). It will further be appreciated that the selective execution of (1) the original application class followed by the new application class, or (2) only of the new application class, can be on an event-by-event basis.

In some embodiments, a computer-implemented method is provided. The method can include providing an interface configured to enable a user to build an application. For example, building the application can include linking building blocks. The building blocks can be configured to process data from data structures. A first input can be received via the interface, wherein the first input corresponds to a request to build a new building block. Further, the method can include adding one or more I/O features to the new building block. For example, the one or more open I/O features can comprise one or more open inputs to the new building block and/or one or more open outputs from the new building block. A plurality of existing building blocks can be accessed. Each existing building block of the plurality of existing building blocks can correspond to a data structure comprising one or more external I/O features. For example, the one or more external I/O features can comprise one or more inputs that are defined for storage to the data structure and/or one or more outputs that are defined for retrieval from the data structure. The method can also include generating a menu object that facilitates a selection of one or more building blocks from amongst the plurality of existing building blocks. An identifier of each of the one or more building blocks can be displayed when the menu object is selected. A second input corresponding to a selection, identified using the menu object, of a particular building block can be received. A third input corresponding to a selection of a particular external I/O feature of the particular building block can be received. For example, the third input can be received to add to a particular open I/O feature of the new building block. The method can also include assigning the particular external I/O feature of the particular building block to the particular open I/O feature of the new building block. The assigning can include storing assignment metadata in association with the new building block. Further, the assignment metadata can indicate a link from the particular external I/O feature to the particular open I/O feature. For example, either an input of the particular building block can be mapped to an output of the new building block or an output of the particular building block can be mapped to an input of the new building block. The definition of the new building block can be stored. The definition can comprise the one or more open I/O features and the assignment metadata.

In some embodiments, another computer-implemented method is provided. The method can include accessing a plurality of existing building blocks. Each existing building block of the plurality of existing building blocks can correspond to a web service associated with a uniform resource identifier (URI). Further, each existing building block can correspond to a data structure configured to receive an input and generate an output using executable logic. A building block from amongst the plurality of existing building blocks can be identified. The building block can be transformed into a machine-readable description language that includes at least one input parameter and a representation of the output associated with the building block. Further, the web service that corresponds to the building block can be invoked. For example, the invocation of the web service can include calling the URI associated with the web service. The calling of the URI can cause the at least one input parameter to pass through the building block, such that the output is generated. A communication corresponding to the output of the building block can be received. The output can be represented in accordance with the representation of the output included in the machine-readable description language. The building block may also be accessible as a building block that can be combined with other building blocks within a building block architecture that also exposes one or more particular other building blocks that are not exposed using web services.

In some embodiments, another computer-implemented method is provided. The method can include providing an interface to enable a user to define a customization setting of building blocks. The method can include identifying an application class associated with an existing building block. For example, the application class ca be associated with one or more rendering objects. The application class can also correspond to executable logic. Further, the method can include identifying a new application class associated with a new building block corresponding to the existing building block. The new application class can be associated with one or more new rendering objects. The new application class can also correspond to new executable logic including customized metadata. An item of user input (for example, a single click, a single tap, a single swipe, or a single keypress) can be received at a building block configuration interface that facilitates a selection. For example, the user input can correspond to a selection of a selectable feature. The state of the selectable feature can define the customization setting for the new building block. The selection of the selectable feature can cause the state of the selectable feature to be modified between a first mode and a second mode, and vice versa. In response to receiving the user input, mode metadata associated with the new building block can be generated and stored. The mode metadata can correspond to a first mode in association with the new building block if the first mode is selected, or a second mode in association with the new building block if the second mode is selected can be processed. If the second mode is selected, responsive to receiving the input, a copy of the one or more rendering objects can be stored in association with the new building block. The method can include receiving a request to execute the new building block. In response to receiving the request, the method can include determining whether the mode metadata corresponds to the first mode or the second mode. When the mode metadata corresponds to the first mode, the application class can be called, such that the customized metadata associated with the new building block is applied to the one or more rendering objects. When the mode metadata corresponds to the second mode, the new application class can be called, such that the customized metadata associated with the new building block is applied the copy of the one or more rendering objects that was stored responsive to receiving the input.

In some embodiments, a computer-program product is provided that is tangibly embodied in a non-transitory machine-readable storage medium. The computer-program product can include instructions configured to cause one or more data processors to perform part or all of a method disclosed herein. In some embodiments, a system is provided. The system can include one or more data processors and a non-transitory computer readable storage medium containing instructions which, when executed on the one or more data processors, cause the one or more data processors to perform part or all of a method disclosed herein.

Advantageously, new applications can be built and/or existing applications can customized without changing the metadata of the underlying original application. Further, any changes made to the metadata of the original application (e.g., in an update or a patch) would not override metadata associated with new or customized applications.

The following detailed description together with the accompanying drawings will provide a better understanding of the nature and advantages of the present disclosure.

BRIEF DESCRIPTION OF THE DRAWINGS

Illustrative embodiments of the present invention are described in detail below with reference to the following drawing figures:

FIG. 7 shows an example interface for mapping primitives to data structures of building blocks.

FIG. 9 shows an example interface for customizing metadata associated with the containers shown in FIG. 8.

DETAILED DESCRIPTION

In the following description, for the purposes of explanation, specific details are set forth in order to provide a thorough understanding of embodiments of the invention. However, it will be apparent that various embodiments may be practiced without these specific details. The figures and description are not intended to be restrictive.

Figure 1:
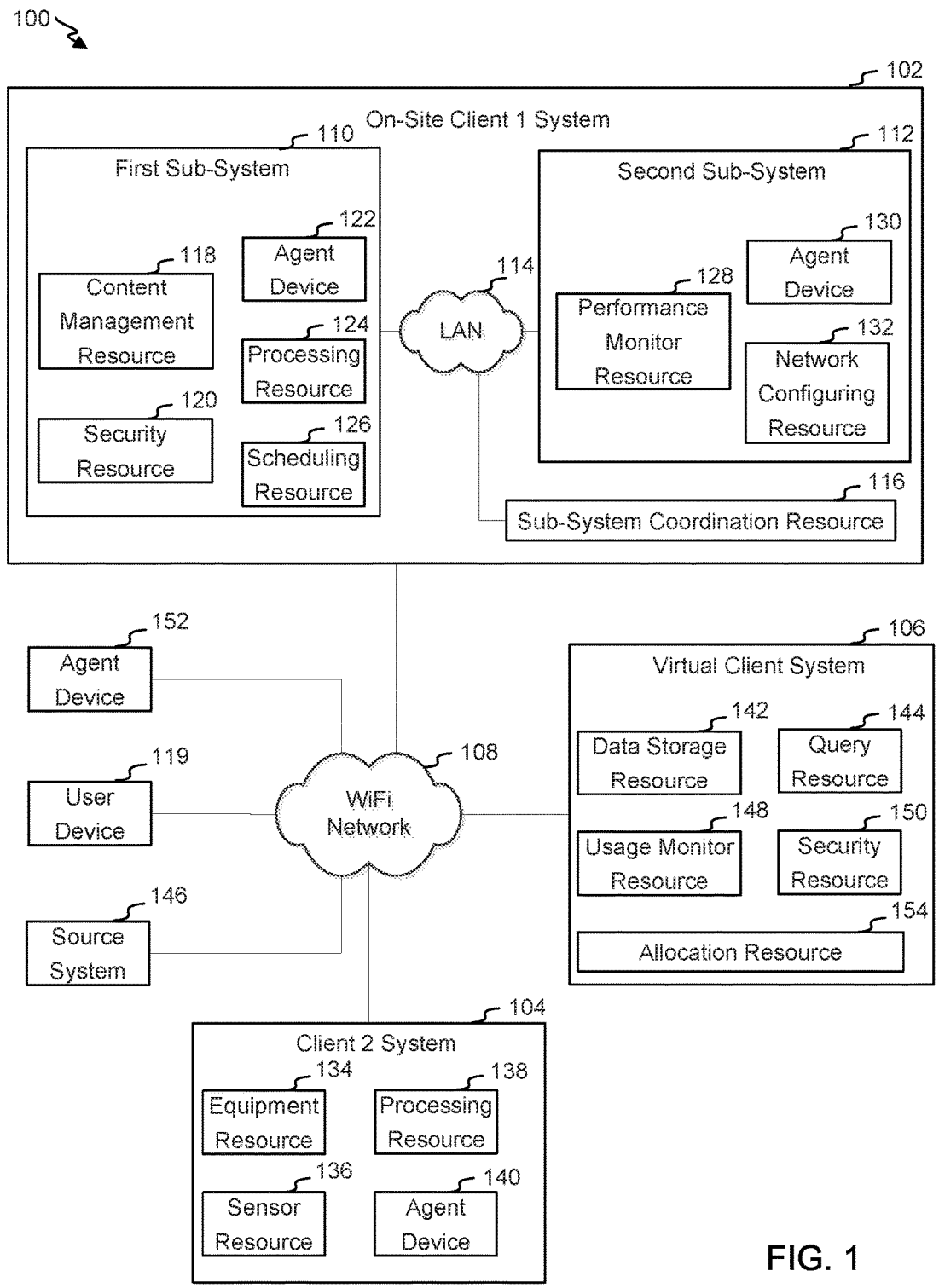
FIG. 1 shows an example network for controlling resource access and operation across sub-systems and/or systems.

FIG. 1 shows an example network 100 for controlling resource access and operation across sub-systems and/or systems. Network 100 includes systems corresponding to multiple clients and to multiple locations. More specifically, each of on-site client 1 system 102, virtual client system 106 and client 2 system 104 can correspond to a set of devices and/or other components, such as one or more servers (e.g., and/or server farms or server clusters), user devices (e.g., desktop computers, laptops, tablets, or smart phones), data storage devices (e.g., network-attached storage), and/or equipment. The set of devices and/or other components can, in some instances (e.g., for on-site client 1 system), be co-located, such as being located within one or more buildings or geographical areas associated with the client. In some instances, the clients need not be co-located but are connected via a network (e.g., a private network). In instances where different parts of a given client's system are at different locations (e.g., part being at an on-site location and part being virtual), the systems may communicate via a network, such as a WiFi network 108.

A system can include multiple sub-systems. Each of the multiple sub-systems may (for example) be configured to perform a different type of operation, to use different resources (and/or different types of resources), to generate different types of outputs, to be located at different geographical locations, to correspond to (e.g., to grant access to) different agents or users (e.g., to different departments of an organization), and so on. For example, on-site client system 102 can include a first sub-system 110 and a second sub-system 112. First sub-system 110 can be configured to receive and respond to requests from user devices for content, and second sub-system 112 can be configured to dynamically monitor and re-configure network resources. First sub-system 110 and second sub-system 112 may communicate via WiFi network 108 or a local area network 114. Each of first sub-system 110 and second sub-system 112 can further communicate with a sub-system coordination resource 116. Sub-system coordination resource 116 may process data from each of one or more sub-systems to (for example) determine whether operation at one sub-system is consistent with operation at another sub-system or with system-level policies and/or to determine how one or more resources are to be allocated to a sub-system.

The implementation depicted in FIG. 1 illustrates various types of resources of systems. It will be appreciated that these resources are illustrative. Resources represented by separate blocks may, but need not, correspond to separate devices or groups of devices.

In the depicted instance, first sub-system 110 includes a content management resource 118, which is configured to query one or more data stores for content responsive to content requests and to transmit responses to content requests. For example, content management resource 118 may be configured to receive HTTP requests from a user device 119 and respond with webpage data. First sub-system 110 can further include a security resource 120, which may be configured to determine what data various users are authorized to receive and/or what types of actions various agents are authorized to make. For example, security resource 120 may receive or intercept a request from an agent device 122 to add or modify data in a content data store (e.g., stored locally at first sub-system 110 or remotely) and to determine whether such an addition or modification is allowed (e.g., based on an authentication of agent device 122 and/or information associated with the request).

First sub-system 110 also includes a processing resource 124, which can be configured to perform data processing, such as processing retrieved content (e.g., to convert it from a first to a second format or identifying particular content objects to retrieve in response to a request). First sub-system 110 further includes a scheduling resource 126, which may monitor incoming requests and identify when each request is to be processed (e.g., by managing a request queue).

Second sub-system 112 includes a performance monitor resource 128, which may assess a data log corresponding to requests being handled by first sub-system 110. The assessment may include monitoring a speed at which the requests are processed and an error rate. Results of the assessment can be transmitted to another agent device 130. A network configuring resource 132 can initiate various reconfigurations that may influence performance, such as server allocation. A reconfiguration may be automatically performed or performed responsive to a request from man agent device, such as agent device 130. An agent-initiated reconfiguration may require an authorization of the agent or agent device.

Client 2 system 104 includes an equipment resource 134 that may be configured to generate outputs. For example, equipment resource 134 may (for example) process inputs (e.g., parts, materials and/or input data) to generate a tangible product (e.g., a manufactured or assembled part) or intangible result (e.g., quantitative characterization of a sample or part, biological metric, environmental data, wireless signal characteristics, and so on). A sensor resource 136 can be configured to generate readings corresponding to an operation of equipment resource 134, such as an operating temperature and/or energy being used. A processing resource 138 can send instruction communications to equipment resource 134, which can control an operation of the equipment resource (e.g., to define inputs, identify types of processing and/or indicate when the resource is to operate). Processing resource 138 may determine such instructions in response to processing requests for particular outputs. Processing resource 138 may further or alternatively assess data corresponding to operation of equipment resource 134 (e.g., characteristics of output data, efficiency of product and/or sensor readings) to determine whether an alert condition is satisfied. In some instances, processing resource 138 operates so as to schedule operations at one or more equipment resources 134, schedule request processing and/or coordinate process control (e.g., via assessment of sensor measurements).

Agent device 140 may provide operation parameters and/or gain access to data. For example, an operation parameter may include or at least partly define a part of a workflow that is to occur (e.g., at least partly via equipment resource 134) as part of a processing of a request. In some instances, a local or remote security resource verifies that a particular agent device or corresponding agent is authorized to provide such parameters and/or gain access.

Virtual client system 106 includes various resources for a system that are, for example, operating in the cloud. In some instances, part or all of virtual client system 106 is identified as being or being used for or by an on-site sub-system (e.g., first sub-system 110 and/or second sub-system 112). A component may, but need not, be shared across two or more sub-systems. In some instances, part or all of virtual client system 106 corresponds to a separate sub-system from one, more or all on-site sub-systems. In some instances, virtual client system 106 includes multiple sub-systems.

In the depicted instance, virtual client system 106 includes a data storage resource 142, which may include databases and/or data stores for a client. The databases and/or data stores may be configured to facilitate periodic updating and/or retrieving data in response to queries generated and coordinated by a query resource 144. For example, a data store can include content objects managed by content management resource 118, and query resource 144 can be configured to generate a query for content objects from an external source (e.g., a source system 146). As another example, a data store can include historical operational data of one or more equipment resources 134 for client 2 system. As yet another example, a data store can include data corresponding to requests for particular types of outputs of equipment resource 134, such that queries of the data store (e.g., as performed using query resource 144) can be used to control operation parameters of equipment resource 134 to facilitate responsiveness to the requests.

A usage monitor resource 148 can generate data logs corresponding to (for example) incoming communications, internal system performance (e.g., of content retrieval or equipment operation) and/or system communications. For example, usage monitor 148 can generate and maintain a data log assessed by performance monitor resource 128 based on monitoring of requests and request responses processed by content management resource 118. As another example, usage monitor 148 can generate and maintain a data log of a quality metric and/or of maintenance events corresponding to equipment resource 134. As yet another example, usage monitor 148 can generate and maintain a data log of sensor measurements collected by sensor resource 136.

Another security resource 150 can assess system access requests, usage patterns, and/or system events to monitor for security threats. For example, a frequency, source and/or request content of content-object requests may be assessed. As another example, a data log is assessed to determine whether any patterns, trends and/or log-element frequencies are indicative of a security threat. As yet another example, security resource 150 may monitor equipment operation or agent instructions to determine whether any operations or instructions are atypical from one or more characteristics of previous instructions or correspond to satisfaction of an alert indication. When security resource 150 detects a potential threat decision, it may trigger an alert to be transmitted to an agent device, such as agent device 122, agent device 140, or an external agent device 152.

An allocation resource 152 can control which cloud resources are allocated to a given client, client sub-system, task performance, and so on. For example, allocation resource 152 can control allocation of memory, data stores (e.g., network attached storage), processors, and/or virtual machines.

Figure 2:
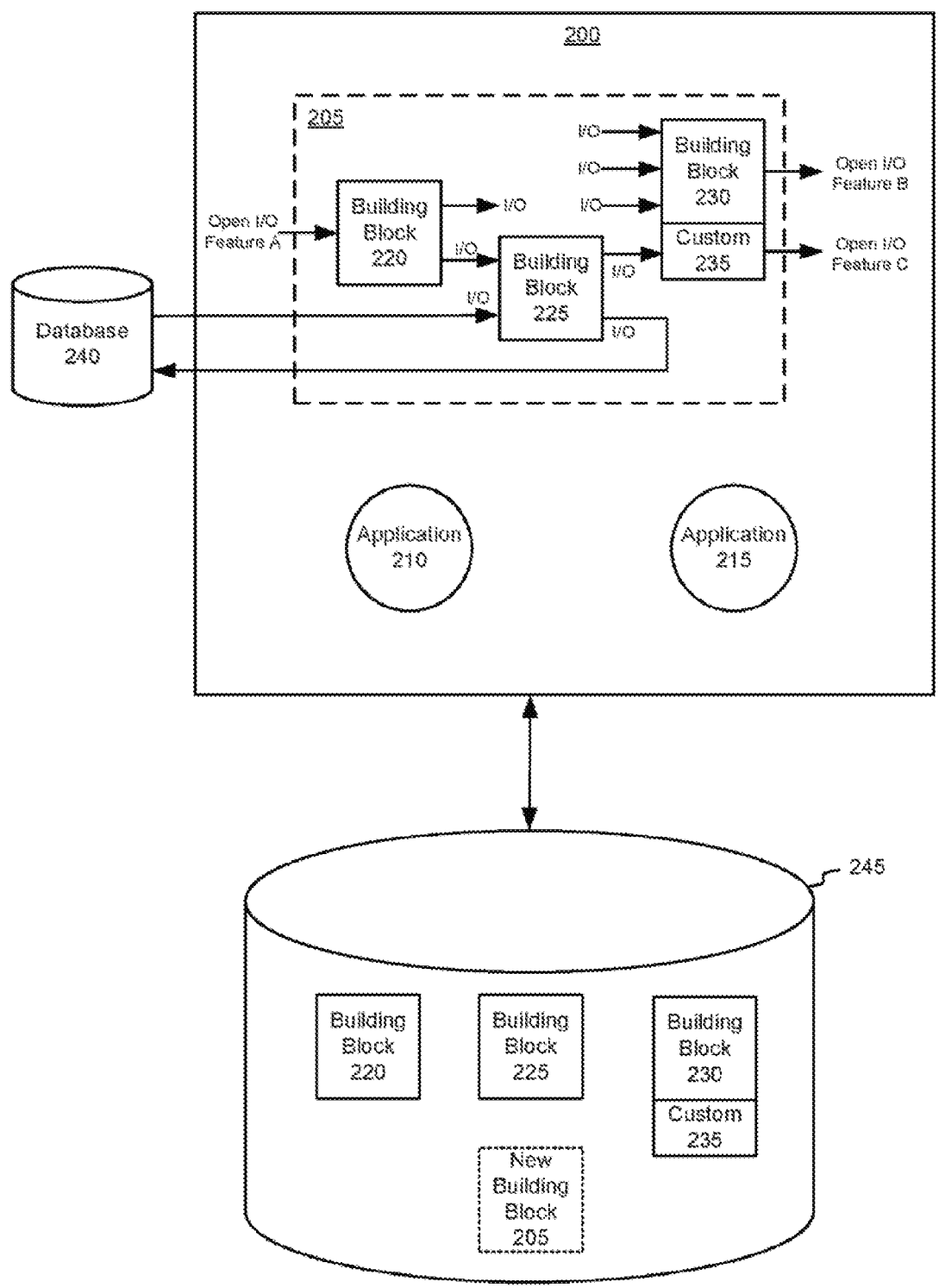
FIG. 2 shows a simplified block diagram of components of an application.

FIG. 2 shows a simplified block diagram of components of an application. As illustrated in the example of FIG. 2, application 200 can be created by a user. For example, the user can be a developer that interacts with a user interface to build or create the application. In some instances, the application can be executable on a browser that is running on a user device (e.g., a mobile device, a smart phone, a tablet computer, a laptop, a desktop, and electronic kiosk, and other suitable devices). Further, the application can be associated with a URI, such that when the application is called (e.g., by entering the URI into the browser running on the user device), the application can be executed (e.g., rendered at run time).

In an embodiment, the user can build application 200 using the user interface. The user interface can receive a request from the user to build new building block 205. For example, the user interface can receive an input corresponding to a selection of a selectable feature (e.g., a button, link, etc.) that initiates a request to build a new building block. A building block can include a portion of code (e.g., executable logic) of an existing application, such that the portion of code is configured to receive inputs and generate outputs. Further, a building block can include a data structure that stores data of one or more data types in records or databases (e.g., columns, rows, tables, lists, etc.). In an embodiment, the data structure can comprise one or more external input/output (I/O) features. An external I/O feature can include an input that is defined for storage to the data structure and/or one or more outputs that are defined for retrieval from the data structure. In some cases, a building block can be defined by input(s) or used value(s), if any; intermediate operation(s) based on the input(s) or other specified value(s) or setting(s); and/or any one or more of the following output(s): data to be provided in-line directly to another connected building block (pushed output); data stored in a data structure to be made available to other building blocks (pullable output); interface configuration, interface configuration metadata; and/or interface content to be rendered on a part of the graphical user interface to which the building block is plugged in. In some cases, the pushed output(s) and/or pullable output can be (or be associated with) an I/O feature of a building block.

New building block 205 can include one or more open I/O features. For example, an open I/O feature can include an unassigned (e.g., open) input to new building block 205 and/or an unassigned (e.g., open) output to new building block 205. An open input can be an input that has not yet been linked to a source (e.g., a record, a database, an output of an existing building block or application, etc.). Further, an open output can be an output that has not yet been linked to a destination (e.g., a record, a database, an input of an existing building block or application).

The user can map existing I/O features from existing building blocks to the open I/O features of new building block 205 using assignment metadata. For example, the user can select a particular existing building block (e.g., building block 220) using a menu object (e.g., a drop down menu) as discussed below with respect to FIGS. 3-6. The user can then map open I/O feature A to one of the I/O features of building block 220 (e.g., the input of building block 220). As only a non-limiting example, building block 220 can be configured to receive a user input, such as a user identification (ID), an address, a phone number, or any other input entered by a user. While not shown in FIG. 2, open I/O feature A can also be mapped to an output of building block 220. As only a non-limiting example, the output of building block 220 can be a function that queries a database for additional information associated with the user ID (e.g., user groups, profile information, etc.).

Mapping an open I/O feature to an I/O feature of an existing building block can include storing assignment metadata in association with new building block 205. In an embodiment, the assignment metadata can include metadata that identifies that the open I/O feature is contextually mapped to the input of building block 220. In another embodiment, the assignment metadata can include metadata that retrieves data from a URI associated with the I/O feature of building block 220. For example, when the executable logic associated with new building block 205 runs, the assignment metadata causes open I/O feature A to get or retrieve data from the assigned I/O feature of building block 220. In this example, the assigned I/O feature of building block 220 can correspond to a data structure that stores various records of data. The assignment metadata can identify that open I/O feature is to retrieve data from a particular record of the data structure that corresponds to building block 220. The various records of data can be retrieved by another building block and/or defined for storage using data from an output of another building block. In another embodiment, the assignment metadata can include a pointer (e.g., a URI, URL) to a network or database location for retrieving data or pushing out data for storage.

In addition, the user can select additional existing building blocks to cascade, combine, or link with an I/O feature (e.g., an output) of building block 220. In the example illustrated in FIG. 2, the user selected an I/O feature of building block 225 (e.g., an input of building block 225) to receive an output of building block 220. In this example, when the executable logic associated with building block 225 is executed at run time, the executable logic, when executed, can analyze the assignment metadata associated with building block 225 to determine that an input of building block 225 is to receive an output of building block 220.

In some embodiments, building blocks can retrieve data from records or databases and/or push data for storage to records or databases. For example, building block 225 can have an I/O feature (e.g., an input) that retrieves data from a database (e.g., database 240). Continuing with an example above, if open I/O feature A corresponds to a user input of a user ID, the data representing the user ID can be passed through building block 220 to an output of building block 220 and into an input of building block 225. Further, building block 225 can query database 240 for additional information associated with the user ID (e.g., user groups, profile information, etc.). Database 240 can return the additional information to building block 225, and as an example, the additional information can be received at an I/O feature (e.g., input) of building block 225.

Further, building blocks can be customized without changing any metadata associated with the underlying building blocks that are being customized. For example, the user creating new building block 205 can select building block 230 (e.g., using a menu object discussed later) as part of building application 200. Building block 230 may have one or more inputs (e.g., I/O features) and one or more outputs (e.g., I/O feature). However, the use may customize the metadata associated with building block 230. For example, if building block 230 includes a function to display a header with static text, the user can customize building block 230 by adding customized metadata 235. As a further example, customized metadata 235 can include a copy of the metadata of building block 230, but with a modification to the header to different text or to an input received at an I/O feature of building block 225 (e.g., the user ID received at building block 220).

It will be appreciated that building blocks 220, 225, and 230 are existing building blocks that were previously created by a developer. Each of building blocks 220, 225, and 230 can have one or more inputs and one or more outputs. For example, when the user who is creating new building block 205 selects building block 220 from a menu object (e.g., a dynamically populated drop-down menu), the user interface can display all of the one or more inputs and one or more outputs previously linked to building block 220. From this list of one or more inputs and one or more outputs associated with building block 220, the user can select an I/O feature (e.g., an input and/or an output) from this list to assign to open I/O feature A, for example. The selection of a particular I/O feature associated with building block 220 can cause assignment metadata (e.g., metadata identifying the link between open I/O feature A and the selected I/O feature of building block 220) to be created and stored.

In an embodiment, the user can add existing applications to application 200. For example, the user can add application 210 and application 215 to application 200. In this example, when an existing application is added to a new application being created, that existing application can be displayed as a button or link when the new application is rendered in a browser. When the button or link associated with the existing application is selected on the displayed new application that is rendered on the browser of a device, the existing application can be executed and the functions included in the new application can be performed.

It will be appreciated that building block data store 245 stores all of the existing building blocks and the metadata (e.g., assignment metadata) associated with the building blocks. It will also be appreciated that the building block data store 245 can store new building block 205 after it is completed and the assignment metadata identifying that building blocks 220, 225, and 230 are included in new building block 205, and the links between the building blocks. For example, building block data store 245 can store metadata that identifies that open I/O feature A of new building block 205 is mapped to a specific I/O feature of building block 220, and so on. It will also be appreciated that the menu object included in the user interface can display new building block 205 when it is completed (e.g., registered). Advantageously, the menu object is dynamically generated in response to a selection to build a new building block, such that the inputs/outputs are the types of inputs/outputs that are compatible with the current/customized building block, and such that the previously defined building blocks list grows as more building blocks are created.

It will also be appreciated that the building blocks can correspond to web services (e.g., a REST service). The building block can be called by entering the corresponding URI into a browser. In an embodiment, the code underlying the building block can be transformed into a web application description language (WADL) or web service description language (WSDL). The WADL or WSDL can expose all of the URIs included in the layout of the building block. A URI can correspond to a container or building block. A user can modify the WADL or WSDL to change the input parameters that pass through the building block or to change the representation of the output (e.g., whether the output is in XML, JSON (JavaScript Object Notation), etc.). In this embodiment, there may not be a need for an HTML interface because the calling of the web service can be achieved by entering the corresponding URI into the browser window.

Figure 3:
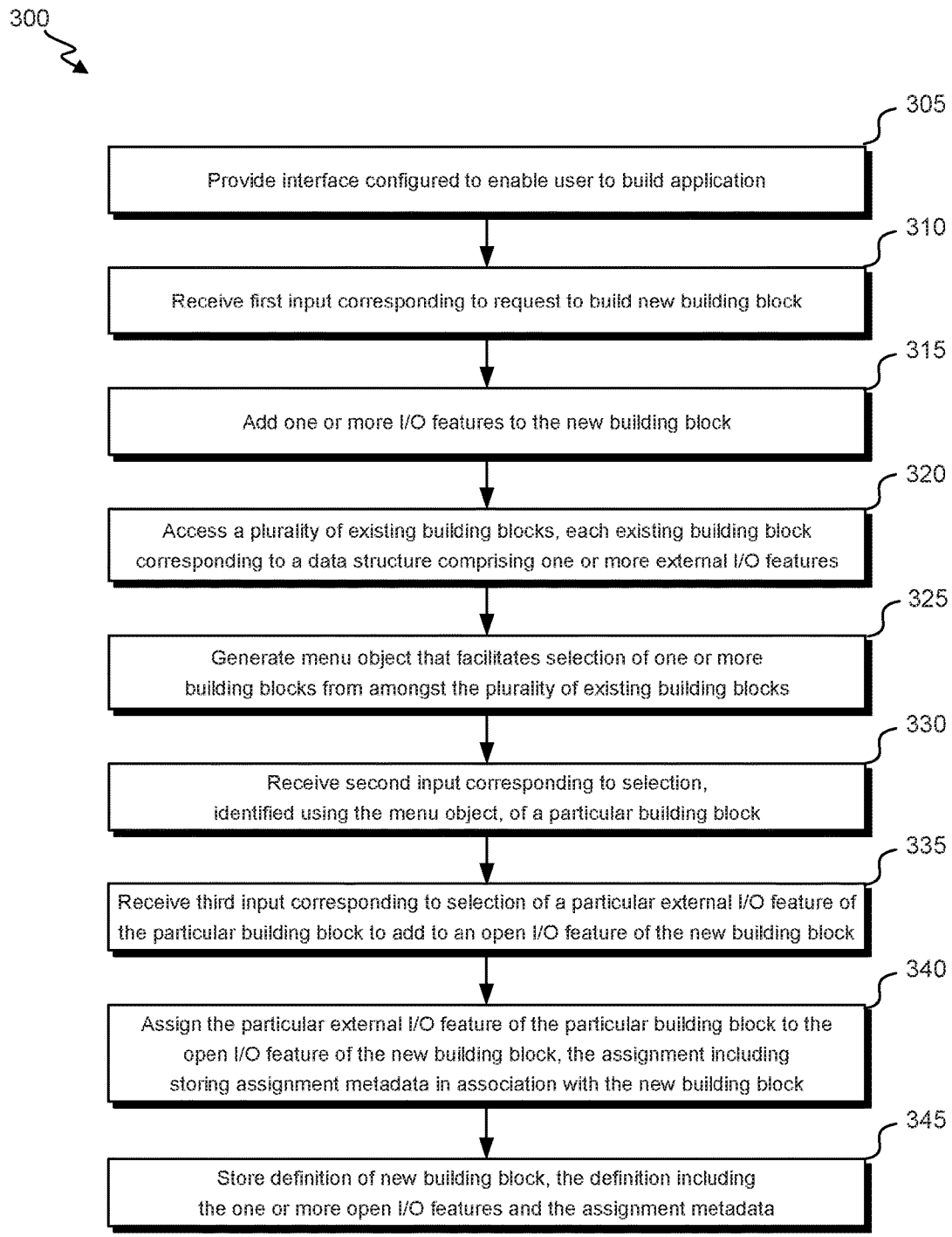
FIG. 3 is a flowchart illustrating a process for building an application.

FIG. 3 is a flowchart illustrating a process for building an application. Process 300 can be performed to build an application using one or more existing building blocks that are linkable using metadata. Further, process 300 can be executed at least in part at a user device and/or one or more servers. At block 305, an interface configured to enable a user to build an application can be provided. For example, the user can be a developer that interacts with a user interface executing on a user device to build or create an application. In some instances, the application can be executable on a browser that is running on the user device (e.g., a mobile device, a smart phone, a tablet computer, a laptop, a desktop, and electronic kiosk, and other suitable devices). Further, building an application on the interface can include linking building blocks. A building block can correspond to a data structure, and the linking of building blocks defines how data from the data structure will be processed (e.g., the context for processing data stored in the data structure). For example, linking an output of a first building block to an input of a second building block defines the context of processing the output of the first building block as the input to the second building block.

At block 310, first input can be received via the interface. For example, the first input can correspond to a user requesting to building a new building block. In some instances, the first input can correspond to a selection of a button, link, or other selectable object presented on the interface. In these instances, the selection of the button, link, or other selectable object can initiate the process of defining the new building block (as further described in blocks 315 to 345 below).

At block 315, one or more open I/O features can be added to the new building block. For example, the interface can enable the user to add one or more open I/O features to be assigned to the new building block. In some instances, one or more open I/O features include one or more open inputs to the new building block and/or one or more open outputs from the new building block. When an open input is added to the new building block, the new building block is configured to receive an input (e.g., a user input received at the interface or an output from an existing building block). Further, when an open output is added to the new building block, the new building block is configured to generate an output from the new building block.

At block 320, a plurality of existing building blocks can be accessed. Each existing building block of the plurality of existing building blocks can correspond to a data structure comprising one or more external I/O features. In some instances, the one or more external I/O features can include one or more inputs that are defined for storage to the data structure. Further, in some instances, the one or more external I/O features can include one or more outputs that are defined for retrieval from the data structure. As discussed below, an external I/O feature can be assigned or linked to an open I/O feature of the new building block using the interface.

At block 325, a menu object can be generated and displayed on the interface. For example, the menu object can facilitate a selection of one or more building blocks from amongst the plurality of existing building blocks. In some instances, an identifier of some or all of the existing building blocks can be displayed within the menu object. For example, the menu object can be a drop down menu that displays the identifiers for each of some or all of the existing building blocks.

Advantageously, according to aspects of the present disclosure, when a new building block is created (e.g., generated, built, defined, registered, etc.), that new building block, or at least an identifier of that new building block, is included in the one or more existing building blocks that are displayed in the menu object. The menu object facilitates selection of one or more existing building blocks in a dynamic manner because the menu object displays existing building blocks and new building blocks as they are registered. For example, the menu object can display a list of existing building blocks, such that each existing building block on the list has external I/O features that are compatible with the open I/O feature of the new building block. The list of existing building blocks displayed within the menu object (in response to the selection of the menu object) can be dynamically updated, such that the list of previously-defined building blocks grows as more building blocks are defined. For example, each time a list is requested for use (e.g., when the menu object is selected) in building a new building block or connecting to an existing building block, the list is generated by determining, at that time, a collection of then-available building blocks and/or their I/O features and populating the list based on the collection. The new building block, along with the metadata associated with the new building block, may become available for selection using the menu object when the new building block is generated (e.g., registered, created, built, etc.).

It will also be appreciated that the menu object can display building blocks (e.g., or identifiers of building blocks) based on a role of the user (e.g., the developer). For example, if the user only has limited permissions to access a limited set of building blocks, then only the limited set of building blocks will be displayed when the menu object is selected. However, if the user has full access to all building blocks, then the menu object can display a list of all of the building blocks or a subset of all of the building blocks (e.g., the subset being all of the building blocks having compatible I/O features with the selected open I/O feature of the new building block).

At block 330, second input corresponding to a selection can be received via the interface. For example, the second input can correspond to a selection of an existing building block from the list of one or more existing building blocks displayed in the menu object. In this example, the selection of the existing building block is identified using the menu object (e.g., an item on the list of existing building blocks displayed in the menu object is selected). In some instances, upon receiving the second input, the interface can be modified to display one or more external I/O features associated with the existing building block that was selected from the menu object. The displayed one or more external I/O features may be available for selection to be linked with an open I/O feature of the new building block.

At block 335, third input corresponding to another selection can be received via the interface. For example, the third input can correspond to a selection of a particular external I/O feature of the existing building block selected in the menu object. In some instances, when an existing building block is selected from a list of building blocks displayed in the menu object, the available external I/O features for that selected building block are also displayed in the interface. The third input can correspond to a selection of one of the available external I/O features of the selected building block. The selection of a particular external I/O feature from a list of available external I/O features can be linked (e.g., added) to a particular open I/O feature of the new building block.

It will be appreciated that, when the available external I/O features of the selected existing building block are displayed, a data truncation test can also be performed. The data truncation test can determine if there is potential for data truncation from the mapping of the particular external I/O feature to the open I/O feature of the new building block. If the potential for data truncation exists, then virtual transformation building blocks can be automatically called. For example, the virtual transformation building blocks can be automatically combined with a selected input (after the input) or output (before the output) building block if a selection is made to connect two otherwise incompatible data types. In this example, the virtual transformation building blocks can be applied in scenarios where data truncation or data loss can be avoided through data transformation (e.g., int→string and string(20)→string(40)). In an embodiment, when the virtual transformation building blocks are called, a message can be presented to the user on the interface requesting that the user confirm calling of the virtual transformation building blocks.

At block 340, the particular external I/O feature (which was selected at block 335) can be assigned to a particular open I/O feature of the new building block. In some instances, assigning the particular I/O feature to a particular open I/O feature can be achieved by storing assignment metadata in association with the new building block. For example, the assignment metadata can include data indicating that the particular external I/O feature is linked to the particular open I/O feature of the new building block. Linking a particular external I/O feature of an existing building block to a particular open I/O of the new building block can include mapping either an input of the particular building block to an output of the new building block, or an output of the particular building block to an input of the new building block.

At block 345, a definition of the new building block can be stored. For example, the definition of the new building block can include data representing the one or more open I/O features and the assignment metadata. In some instances, the assignment metadata can include data that represents a link to one or more external I/O features of one or more existing building blocks. Advantageously, when the definition of the new building block is stored or registered (e.g., in a data store within the building block platform), the new building block can be listed in the menu object as an existing building block if the menu object is selected at a later time. If a new building block (which has been registered) is selected at a later time using the menu object, then the one or more open I/O features can be treated as one or more external I/O features and displayed in the interface as being available for selection in association with a different new building block.

Figure 4:
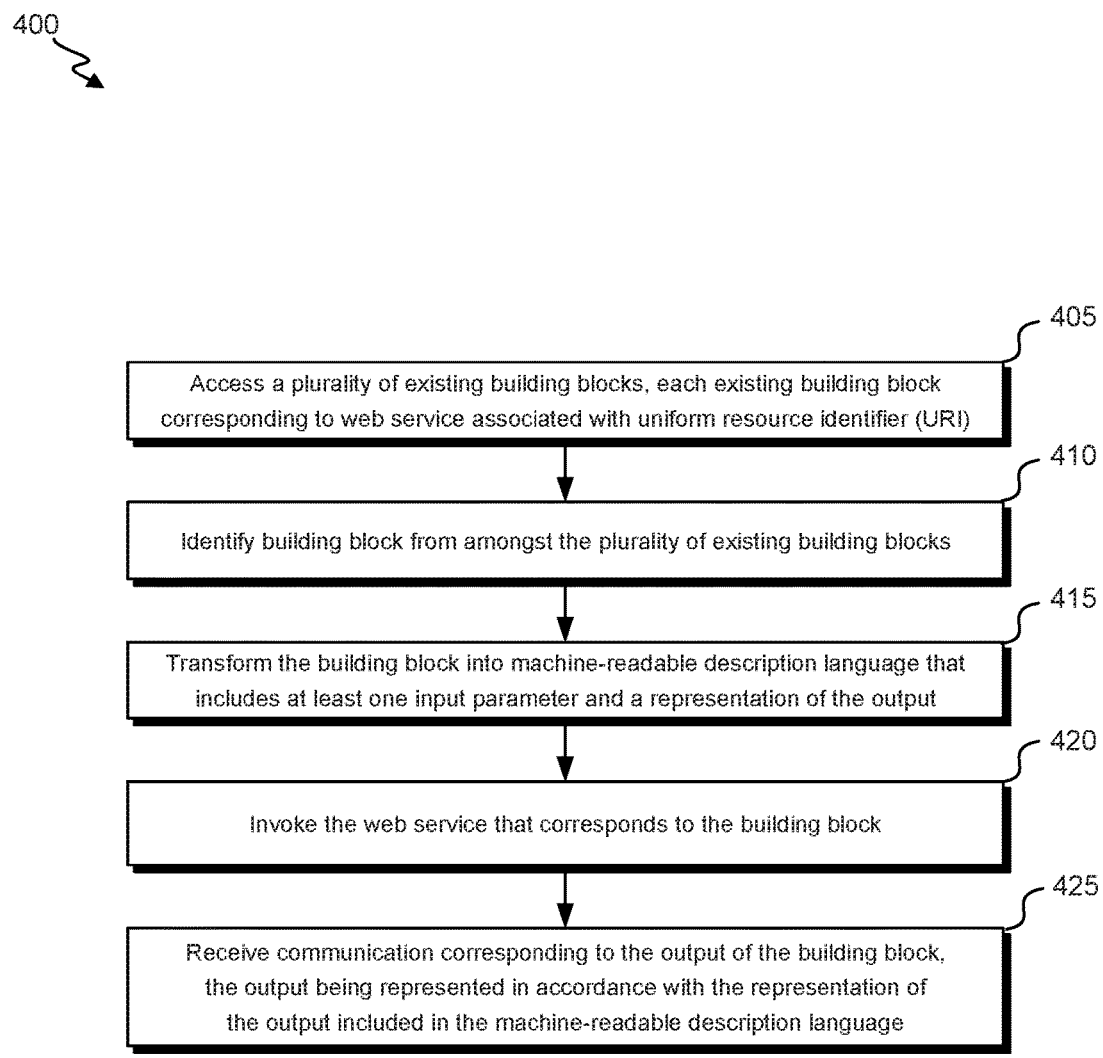
FIG. 4 is a flowchart illustrating a process for calling building blocks as web services.

FIG. 4 is a flowchart illustrating a process for calling building blocks as web services. Process 400 can be performed to call one or more building blocks and/or one or more applications using web services (e.g., a REST service). Further, process 400 can be executed at least in part at a user device and/or one or more servers. Process 400 begins at block 405, where a plurality of existing building blocks can be accessed. In some instances, each existing building block of the plurality of existing building blocks can correspond to a web service associated with a uniform resource identifier (URI). Further, each existing building block can correspond to a data structure configured to receive an input and/or generate an output using executable logic. In some instances, when the URI associated with the web service is received as an input at a web browser, the building block that corresponds to the web service can be executed. At block 410, a building block from amongst the plurality of existing building blocks can be identified.

At block 415, the building block (identified at block 410) can be transformed into a machine-readable description language that includes at least one input parameter and a representation of the output associated with the building block. For example, the machine-readable description language can be a WADL or WSDL transformation of the building block.

At block 420, the web service that corresponds to the building block can be invoked. In some instances, the invocation of the web service can include calling the URI associated with the web service. Further, calling the URI can cause the at least one input parameter to pass through the building block, such that the output is generated. For example, invoking the web service can include receiving the URI of the application as an input to a web browser.

At block 425, a communication corresponding to the output of the building block can be received in response to calling the URI associated with the web service. For example, the output can be represented in accordance with the representation of the output included in the machine-readable description language. In some instances, the output can be stored in the data structure or in another data structure associated with the building block. Further, in some instances, the building block is accessible as a building block that can be combined with other building blocks within a secure building block architecture service (e.g., such as one that is accessible via authentication) that also exposes, for building within the building block architecture service, one or more particular other building blocks that are not exposed using web services.

It will be appreciated that an application can be transformed into a REST service (e.g., Web Application Description Language (WADL)). For example, the interface can include a wizard that guides the user through a process of transforming the application into the WADL. In this example, the user can select an existing application (including one or more building blocks) or an existing building block using the interface, and then the application (and the one or more building blocks that make up the application) or the existing building block can be transformed into the WADL. When the application or the building block is transformed into the WADL, the WADL can be used to call the application or the building block using one or more URIs included in the WADL. For example, a user outside the building block architecture can view the WADL (e.g., using an Application Program Interface (API)) and identify the URIs for the applications or building blocks included in the WADL. Additionally, header properties of the WADL can be modified to define the format of the data (e.g., the output of the application or building block) to be received in response to calling an application or executing a building block. As a further example, if an application being called using a WADL is configured to output data in HTML, a user can modify a request header when calling the application, such that the output data is received in JSON, instead of HTML.

Figure 5:
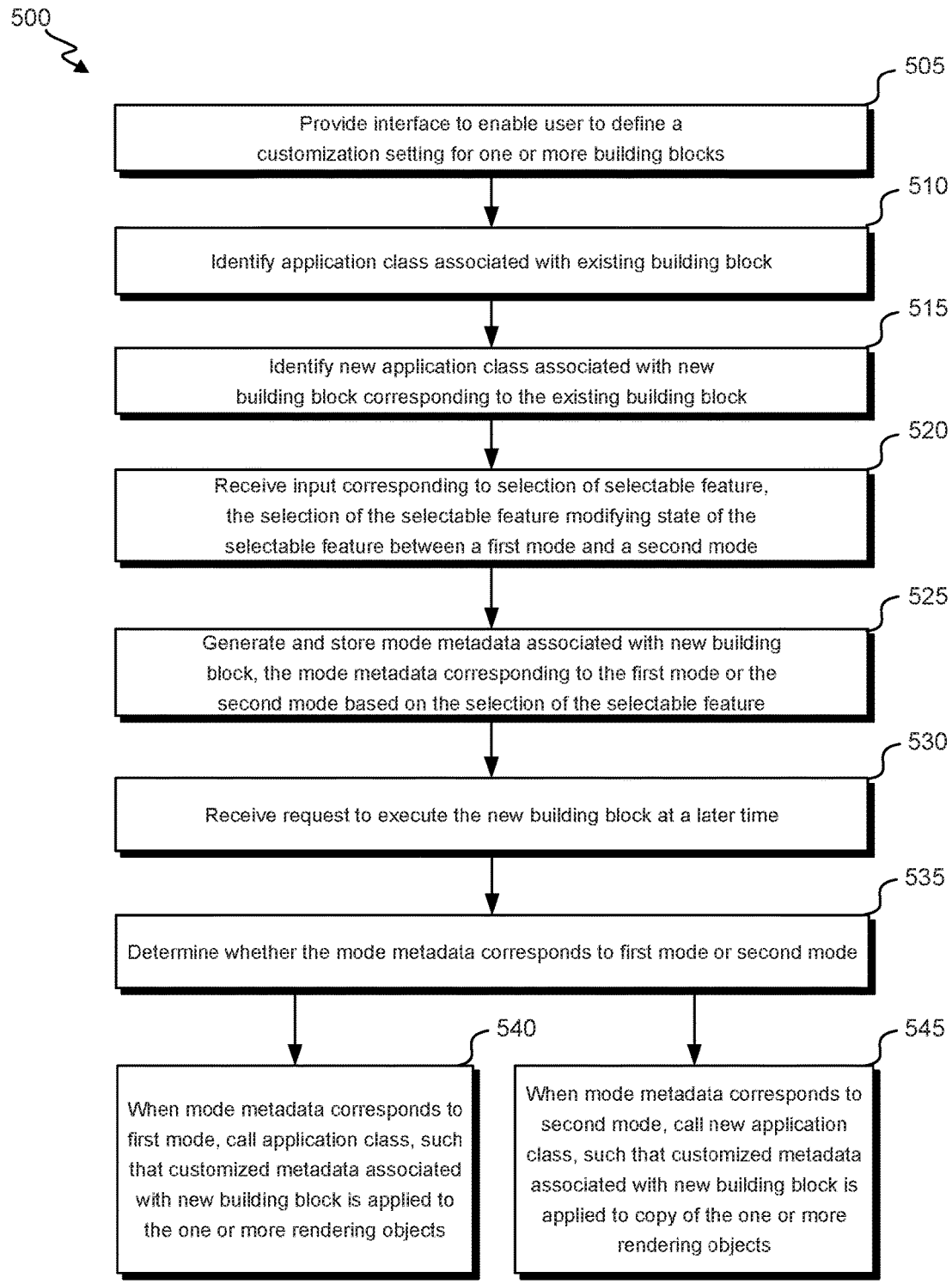
FIG. 5 is a flowchart illustrating a process for customizing applications.

FIG. 5 is a flowchart illustrating a process for customizing applications. Process 500 enables a user (e.g., an administrator) to turn on and off customizations that are applied to an application and/or to a building block included in an application. Further, process 500 can be executed at least in part at a user device and/or one or more servers. For instance, delivered applications (e.g., applications provided by an application provider, such as PEOPLESOFT™) may be customized by an administrator. Advantageously, if a delivered application is modified (e.g., with a patch or an update) by the application provider, the administrator can turn on or off the customizations applied to the delivered application using process 500, for example, in order to determine which modifications were made by the application provider.

Process 500 begins at block 505, where an interface is provided to the user (e.g., displayed on a user device). For example, the interface can be configured to enable a user to define a customization setting for one or more building blocks associated with an application. In some instances, the customization setting for one or more building blocks can be a setting that indicates whether to apply customized metadata (e.g., generated by a new application class) to one or more rendering objects of an existing building block, or to create a custom building block that generates its own rendering object.

At block 510, one or more application classes associated with an application can be identified. An application class can be associated with one or more rendering objects. For example, a rendering object can include executable logic that includes one or more functions configured to process an input and generate an output. As a further example, an application class can be a program including executable code (e.g., PEOPLECODE™). In some instances, the application class can be identified using the interface (e.g., in event details 910 or 920 as shown in FIG. 9). For example, interface 800 can include a tab that links to an interface page displaying the application classes associated with the application or new building block being created.

At block 515, a new application class associated with a new building block can be identified. The new building block can correspond to an existing building block in that an open I/O feature of the new building block can be linked to an external I/O feature of the existing building block. As an example, the new application class can include new executable logic that includes customized metadata. In this example, when an administrator customizes a delivered application, the code for the customizations can be stored in the new application class. Each building block can be associated with one or more new rendering objects. For example, when a building block is executed, the data that is generated can be stored as an object and passed through a new application class, depending on the customization setting. Further, the new application class can correspond to new executable logic including customized metadata.

At block 520, input can be received via the interface. For example, the input can include a single click, a single tap, a single swipe, or a single keypress, or any combination thereof. As another example, the input can correspond to a selection of a selectable feature (e.g., a checkbox). In some instances, the interface can be a building block configuration interface that facilitates receiving the input. As only a non-limiting illustration, FIGS. 6-9 show examples of interfaces that may include a building block configuration interface. In some instances, a state of the selectable feature defines the customization setting for the new building block. The selection of the selectable feature can cause the state of the selectable feature to be modified (e.g., toggled) between a first mode and a second mode.

At block 525, responsive to the selection (at block 520), the mode metadata can be generated and stored in association with the new building block. For example, the mode metadata can correspond to a first mode if the state of the selectable feature corresponds to the first mode, or a second mode if the state of the selectable feature corresponds to the second mode. The input of block 520 can correspond to a selection (using the selectable feature presented on the interface) of either the first mode or the second mode. In some examples, the selection of the second mode using the selectable feature can cause a copy of the one or more rendering objects to be stored in association with the new building block (e.g., in a server as metadata). In these examples, the new building block is configured, such that at runtime, the new building block generates its own new rendering object and does not receive the rendering object of the existing building block as input.

At block 530, a request can be received to execute the new building block. For example, the request to execute can be a request to instantiate the new building block. At block 535, in response to the request received at block 530, it is determined whether the mode metadata corresponds to the first mode or the second mode. For example, if the mode metadata corresponds to the first mode, process 500 proceeds to block 540 where the application class is called, such that the customized metadata associated with the new building block is applied to the one or more rendering objects (e.g., associated with the application class). If the mode metadata is associated with the second mode, process 500 proceeds to block 545, where the new application class is called, such that the customized metadata associated with the new building block is applied the copy of the one or more rendering objects that was stored responsive to receiving the selection of the selectable feature. In some instances, the first mode can correspond to a situation in which an existing building block is customized based on metadata that is executed on top of a (single) rendering object (e.g., customized with metadata). For example, at runtime of executing the new building block, the one or more rendering objects associated with the application class are passed as input into the new application class and the customized metadata of the new application class is executed. The second mode can correspond to a situation in which an existing building block is copied and a custom building block is created, such that the custom building block generates its own rendering object (natively custom), instead of using the rendering object of the existing building block. For example, at runtime of executing the new building block, the one or more rendering objects associated with the application class are not passed as input into the new application class and the one or more new rendering objects associated with the new application class are generated.

Figure 6:
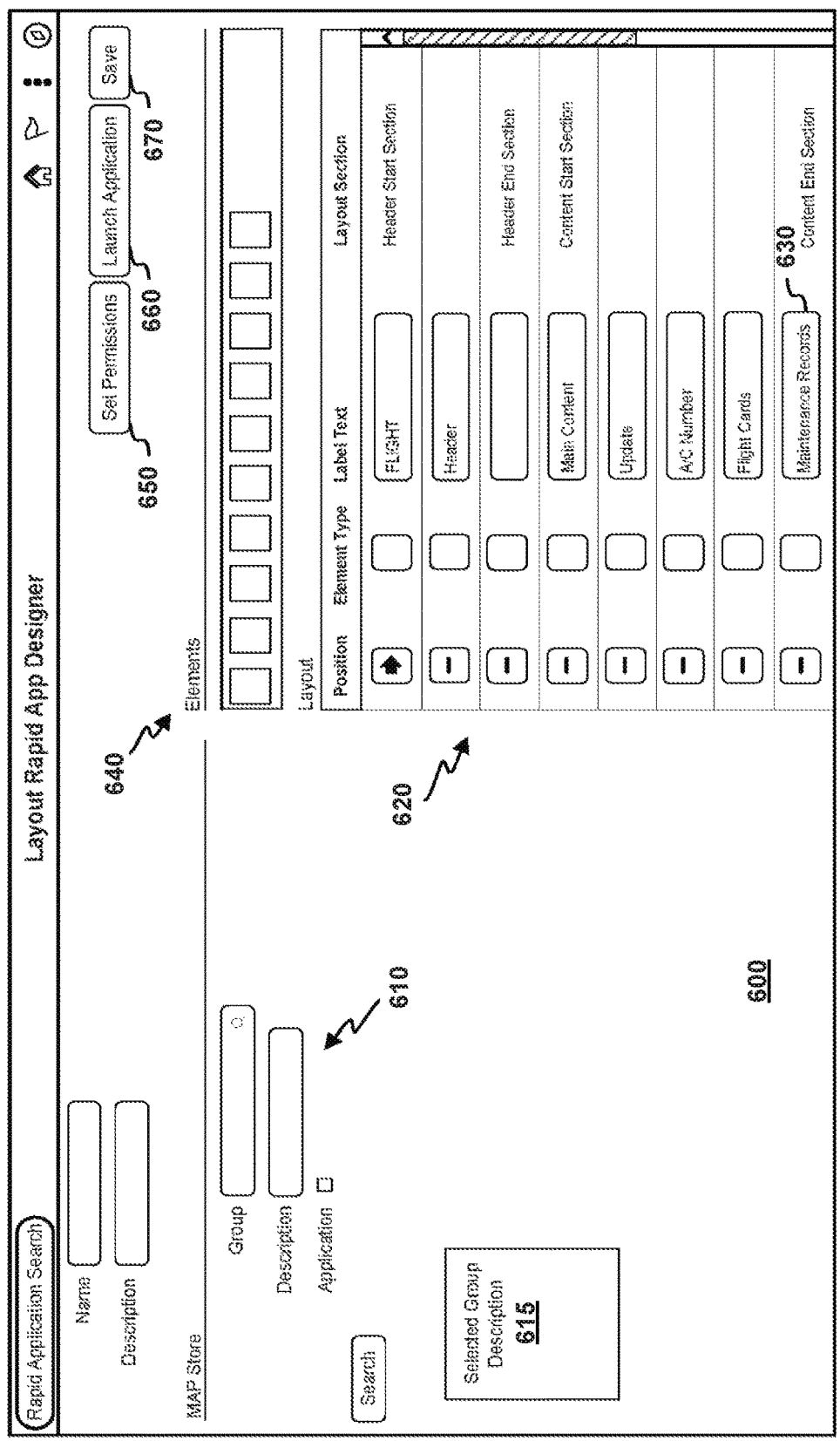
FIG. 6 shows an example interface for building an application using building blocks.

FIG. 6 shows an example interface for building an application using existing building blocks. In an embodiment, the interface can include Layout Rapid App Designer 600 (referred to herein as app designer 600). For example, app designer 600 can enable a user (e.g., a developer, an administrator, etc.) to rapidly design, create, or build a new application without needing to write any code. In this example, app designer 600 enables the user to design a layout (e.g., layout 620) for the new application that includes one or more existing building blocks (e.g., header 630). The one or more existing building blocks can be tied together or connected using context data (e.g., assignment metadata). In an embodiment, app designer 600 can include Mobile Application Platform (MAP) Store 610, layout section 620, elements section 640, a "set permissions" button 650, a "launch application" 660, and a save button 670.

MAP Store 610 can include a group search bar and a description bar. The group search bar can enable the user to search for existing building blocks to add to layout 620. For example, selecting the group search bar (e.g., the magnifying glass icon) causes a lookup popup window to be presented to the user. The user can then select a group of one or more building blocks from the lookup popup window. In an embodiment, when a building block is selected from the lookup popup window, the building blocks included in the group are populated in the "selected group description" section 615. In an embodiment, MAP Store 610 can access building block data store 245 as shown in FIG. 2. Further, building blocks can be customized. When the customized building block is completed and stored, that customized building block becomes available in MAP Store 610 (e.g., becomes available in the lookup popup window), such that the previously defined building blocks list grows as more building blocks are defined.

In some instances, layout 620 can include the core data set that is rendered when the new application is executed. For example, the developer or administrator can select an existing building block that prompts for an input (e.g., a user ID) that can be populated in the data structure associated with the selected building block. To achieve this, the developer or administrator would select the building block and add it to layout 620. In some instances, layout 620 indicates what code is rendered and how the code is rendered (e.g., where it is displayed on the browser screen) when the application is executed (e.g., at run time). For example, layout 620 can include a header section, a content section, and a footer section. The various building blocks can be added to these different sections of layout 620.

For example, layout 620 can include a building block 630 that corresponds to maintenance records. As a non-limiting example, the maintenance records can include records associated with planes, cars, or other suitable vehicle. In this example, building block 630 can include a data structure including values of all of the maintenance records associated with a particular vehicle. Examples of the data structure can include a chart, an array, a grid, a table, and excel sheet, and so on. The data structure can include one or more columns of data and one or more rows of data.

Element section 640 can include one or more elements (e.g., widgets) that can impact properties of the building blocks included in layout 620. For example, an element in element section 640 can include a widget for changing the representation of the data structure (e.g., to change a view type, change a structure type, change label text, and the like). Using the example of building block 630 being a data structure of maintenance records, the properties of building block 630 as it is represented in layout 620 can include presenting the maintenance records in a table form when the new application is rendered on a browser. The user can select building block 630 and also select the widget for changing the representation of the data structure. Upon selecting the widget, the properties of building block 630 as it is included in layout 620 can be changed (e.g., changing the maintenance records so that they are represented in a list view as opposed to the table form) when the new application is rendered using a browser.

In this example, while the representation of the maintenance records were changed from a table form to a list view, it will be appreciated that the underlying maintenance records (e.g., the values of the maintenance records) were not changed. In this example, the selection of the widget only caused the table form of the maintenance records to be transformed into a list view of the maintenance records. According to embodiments of the present disclosure, the layout (e.g., layout section 620) changes the representation and properties of the building blocks that are included in the new application, such that the building blocks are presented in accordance with the determined properties. In an embodiment, a modification to the representation and properties of a building block when the building block is included in layout 620 refers to a modification of the metadata of the building block only within layout 620. In this embodiment, the modifications to the metadata of the building block within layout 620 (e.g., modifying building block 630 so that the data structure is represented as a list view instead of a table form at run time) do not impact the metadata of the underlying building block (e.g., as stored in building block data store 245, or as accessible by the MAP Store, etc.). For example, the underlying building block still corresponds to the data structure (e.g., the records that store the maintenance records of the vehicle are unchanged), but only the representation (e.g., table form or list view) is changed when building block 630 is added to layout 620.

App designer 600 can also include a "set permissions" button 650, a "launch application" button 660, and a "save" button 670. In an example, the "set permissions" button 650 can be selected to define the permissions associated with each building block and/or application. For example, permissions can be set to require that valid login credentials before the functionality of a building block can be accessed by an end user of the application. In another embodiment, end users of the application can have full access to a subset of building blocks, and can have limited access (e.g., requiring login credentials) for another subset of building blocks. Further, the "launch application" button 660 can launch the new application. For example, launching the application can render the building blocks in layout 620 on a browser window. Further, the "save" button 670 can be clicked to save the current status (e.g., current configuration or properties) of the building blocks in layout 620.

It will be appreciated that a building block can include definitions of contexts (e.g., the building block, when called, prompts the end user of the application to enter a mailing address). When the building block is included in the new application, the building block can include different URIs that the developer used when the building block was created. When certain input is inputted into the building block, the output can be determined. For example, the user can tie the output of an existing building block and feed that into an input of a new building block being created for a new application.

FIG. 7 an example interface for mapping primitives to data structures of building blocks. The interface can include URI Mapping page 700. When a building block is selected from the Selected Group Description 615 (as shown in FIG. 6), the URI Mapping page 700 can be displayed. The URI Mapping page 700 enables a user to add an open I/O feature (e.g., an unassigned input) to the selected building block using metadata from the existing building block (e.g., assignment metadata that identifies any other I/O features of other building blocks mapped to an I/O feature of the existing building block). In an embodiment, URI Mapping page 700 can include a "mapping layouts" menu object 710, "available layout URIs" section 720, "URI elements requiring mapping" section 730, and "available primitives" section 740. For example, a primitive can be a data element included in a data structure.

In an embodiment, assignment metadata can correspond to the mapping information of I/O features defined for a particular building block. If a user (e.g., a developer) builds an application using app designer 600, for example, the user can define what location to get inputs (e.g., a record location in a data structure) and what location to store outputs (e.g., a record location in a data structure) for a new building block to be rendered when the application is called (e.g., executed). At the application layer of the new application or building block, for example, there may be a Representational State Transfer (REST) service that is created. The REST service can identify the URI that corresponds to the input, for example. The specific context of data can be based off the URI. When the user builds an application, the user actually is building the URI because when the user defines the application, and the user can add the one or more inputs, which can return specific context when the application is rendered at run time (e.g., using a browser). Further, the output that is received after the application is rendered can correspond to the logical structure of data that is used to drive the application. For example, the building block data store 245 can provide access to a plurality of existing building blocks. As described above, a building block is a piece of code of an existing application. When a new building block is being created, the open I/O features of the new building block can be added or defined. The open I/O features for the new building block can be the inputs for that building block, from another building block, or from the user interface. These inputs can be passed through the application, which would generate contextual data that that application uses, and the user can take that data and map that to an input of another building block.

In the example URI Mapping page 700 of FIG. 7, when a building block is selected to be added to the new application (as shown with respect to FIG. 6), the URI Mapping page 700 can be presented to the user to enable the user to add open I/O features to the new building block, and to map the open I/O features to I/O features of existing building blocks. For example, the "mapping layouts" menu object 710 provides a drop-down menu showing all of the I/O features that exists for an added open I/O feature of the new building block that is added to the new application. For example, "available layout URIs" section 720 shows a list of defined open I/O features for the new building block. In this example, the open I/O features for the new building block include "A/C Number," "Pilot Name," and "Fight Test Destination." As a further example, the user can select at least one of the items (e.g., "Pilot Name") in "available layout URIs" section 720 as an open input of the new building block. Accordingly, the inputs can be of a particular data type (e.g., string(30)) given that that the selected open input of the new building block is, for example, "Pilot Name" as shown by the selected checkbox corresponding to "Pilot Name."

The "mapping layouts" menu object 710 provides a drop-down menu of all available contextual building blocks from which the open input can be taken. For example, "mapping layouts" menu object 710 can display a drop-down menu object of all existing building blocks from which data representing the "Pilot Name" can be taken. In FIG. 7, "mapping layouts" menu object shows that the "Pilot Name" (selected in the "available layout URIs" section 720) can be taken from the building block that corresponds to "Maintenance Records." Further, examples of the menu object of "mapping layouts" menu object 710 can include a drop down list, a search field with predictive text, a flyout menu, a dropline menu, an accordion menu, or other suitable menu object.

In some embodiments, a data type checking analysis is performed, such that the building blocks listed in the drop-down menu of "mapping layouts" menu object 710 all correspond to the same data type as the selected open input (e.g., "Pilot Name"), which was selected in "available layout URIs" section 720. For example, the data type of string(30) can be retrieved from the building block associated with maintenance records and can be fed into the open I/O feature of "Pilot Name," which also has a data type of string(30).

In some embodiments, "available primitives" section 740 can show all primitives in the data structure that correspond to the maintenance records building block. For example, a primitive can be a data element included in the data structure. In this example, the maintenance records building block corresponds to a data structure that includes primitives (e.g., records) of "pilot," "aircraft number," "squadron," "aircraft type," and so on. In some embodiments, the primitives shown in "available primitives" section 740 can be primitives that share a compatible data type as the selected open I/O feature "Pilot Name" (e.g., only primitives that share a string(30) data type with the open I/O feature).

In one embodiment, if a primitive having a data type of an integer is selected to be mapped with the open I/O feature that has a data type of string(30), the URI Mapping page 700 can present an error indicating that the mapping is incompatible. For example, an incompatible mapping can refer to the potential occurrence of data truncation if an I/O feature were fed into the selected open I/O feature of the new building block. In another embodiment, a data truncation test can be performed upon the selection of an available primitive for mapping onto the open I/O feature. For example, the data truncation test can determine if the data can be mapped from the selected primitive (e.g., "pilot" 750) to the open I/O feature (e.g., "Pilot Name") without data truncation.

If the potential for data truncation exists from the mapping, then virtual transformation building blocks can be automatically called. For example, the virtual transformation building blocks can be automatically combined with a selected input (after the input) or output (before the output) building block if a selection is made to connect two otherwise incompatible data types. In this example, the virtual transformation building blocks can be applied in scenarios where data truncation or data loss can be avoided through data transformation (e.g., int→string and string(20)→string (40)). In an embodiment, when the virtual transformation building blocks are called, a message can be presented to the user requesting that the calling of the virtual transformation building blocks be confirmed by the user before the transformation building blocks are called.

In an embodiment, the selection of a primitive from the "available primitives" section 740 can be performed by receiving an input corresponding to a selection of the checkbox next to "Primitive" in the "URI Elements Requiring Mapping" section 730. Upon checking the checkbox next to "Primitive" in the "URI Elements Requiring Mapping" section 730, the URI Mapping page 700 presents a page to the user where the user can select an available primitive from the list of available primitives. In one embodiment, the page also shows the various data types associated with the available primitives, such that if the user selects a primitive having an incompatible data type, then a warning or error message can be displayed. In another embodiment, the virtual transformation building blocks can be automatically called to facilitate a transformation of the mapped data, such that data truncation does not occur. Further, selection of "Constant" in the "URI elements requiring mapping" section 730 can prompt the user to enter text that can be used as static text, such that the input of "Pilot Name" may always be the entered text.

It will be appreciated that the "mapping layouts" menu object 710, when selected, can display a hierarchy of available building blocks to which the open I/O feature can be mapped. It will also be appreciated that the building blocks can be categorized manually, automatically, or by the owner of the building block (e.g., the developer who created the building block). The categorization of the building blocks can be used to sort the list of displayed building blocks available for mapping. It will also be appreciated that the "mapping layouts" menu object 710 can also be a search tab that populates the relevant building blocks as text is entered into the search tab (e.g., using predictive text techniques). It will also be appreciated that menu object 710 can display building blocks based on a role of the user (e.g., the developer). For example, if the user only has limited permissions to access a limited set of building blocks, then only the limited set of building blocks will be displayed when the menu object 710 is selected. However, if the user has full access to all building blocks, then the menu object can display a list of all of the building blocks or a subset of all of the building blocks (e.g., the subset being all of the building blocks having compatible I/O features with the selected open I/O feature of the new building block).

Figure 8:
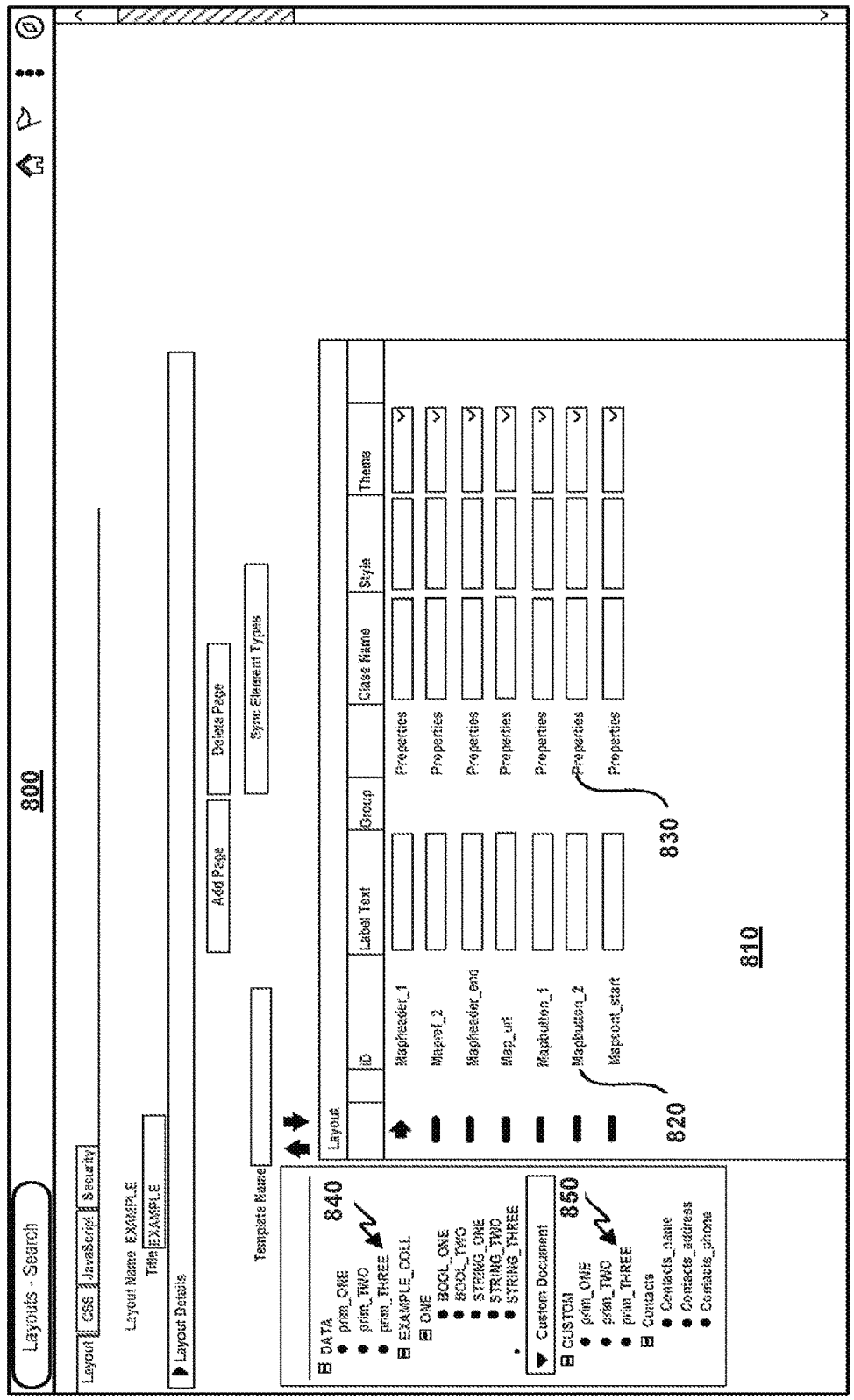
FIG. 8 shows an example interface for building an application using containers.

FIG. 8 shows an example interface for building an application using containers. FIG. 6 showed an example interface for building an application using a rapid app designer 600, where the user did not need to write any code. However, FIG. 8 shows an example interface for building an application using containers (e.g., used interchangeably with building blocks herein), such that the user may need to write code to customize the containers and/or events associated with the containers. The example interface of FIG. 8 is an application designer interface 800 that includes layout 810, parent data structure 840, and custom data structure 850. In some embodiments, application designer interface 800 enables a user to define data structures and to customize existing containers and data structures. Further, application designer interface 800 also enables a user (e.g., a developer) to define inputs for containers and data structures associated with the containers. For example, a user can define that a container will receive an input of a user ID, then the user can select a user id primitive (e.g., data element) from parent data structure 840 or custom data structure 850.

In an embodiment, a containers (e.g., container 820) can refer to building blocks. For example, a container can refer to a section on a page (e.g., a header, content section, a footer, etc.). Further, the context metadata (e.g., the assignment metadata) can be the mapping of containers to one or more other containers, such that the I/O features of one container are the types of I/O features that are compatible with the other containers. For example, one container can show a list of flight cards. For one application, whenever code is wrapped in a container, that container is defined in a building block data store. While an application can include one or more containers, on the back end (e.g., the servers rendering the code) the complete application is being executed.

Layout 810 can include one or more containers that will make up the application being built by the user. For example, a container can be a header of the application when the application is rendered on a browser. In this example, the user can add existing containers from previously-built applications, customize the existing containers, or create new containers. When a container is added to layout 810, the user can associate a primitive (e.g., a data element of a data structure) with the container, such that the defined inputs can populate the rows and columns of the data structure. In an embodiment, the data structure can drive the data used in the application. For example, if the container corresponds to an input (e.g., code that gets a value or input), then a data element (e.g., primitive) of the data structure can be mapped to the container such that the input of the container comes from the data element.

For example, layout 810 can include container 820 corresponding to "Mapbutton_2," which can be a button displayed on a browser page when the application is executed. The "Label Text" column can be modified by the user, such that the text entered in the "Label Text" box can be presented on the browser page when the application is executed. Further, properties 830 can be a link to another page or a popup window of application designer 800 that enables the user to customize metadata associated with container 820. For example, the user can map container 820 to a primitive of data structure 840 or custom data structure 850.

In an embodiment, parent data structure 840 can be customized by the user. For example, to customize the EXAMPLE Application, the user can create a new Layout via the MAP Layout Designer as Type: custom and assign layout 810 to be customized (Parent Layout). The user has the option to assign an additional data structure (e.g., custom data structure 850) to the customized layout (which is different from layout 810). Application designer 800 can display both the data structure 840 (e.g., corresponding to layout 810, the Parent Layout) and custom data structure 850 (e.g., corresponding to at least a portion of data structure 840) on the left side. For the custom layout (not shown), the page is initially empty of elements other than the Header and Footer containers. The application designer 800 can display all the events assigned to a container included in layout 810.

Further, the user can optionally assign their own created application classes that can be used to modify any data and content assigned on the layout 810.

FIG. 9 shows an example interface for customizing metadata associated with the containers shown in FIG. 8. The example interface can include building block configuration interface 900. Building block configuration interface 900 can include event details 910 and 930 for the parent application (e.g., the original application that is potentially being customized). The event details describe the configuration settings for events. For example, the parent application can include a save button, such that when the save button is clicked a save event occurs (e.g., a popup window appears on the browser with a message). Further, building block configuration interface 900 can also include custom event details 920 and 940. The custom event details can include customizations made to containers of the parent application that are included in the custom application. For example, the user can add a custom application by adding containers from the parent application to a custom layout. Any changes or customizations made to the containers added to the custom layout would not affect the metadata of the containers included in the parent application because these containers are added to the new custom layout and their corresponding metadata is also saved in association with the custom layout. Accordingly, in some embodiments, changes made to the containers in the custom layout impact the container in the custom application, but not the same container in the parent application.

For example, the assigned application class for "Event Type: INIT" can modify the corresponding container of the parent application, such that the value entered for the "Entry Input Element" reads "Custom Input". Further, the assigned application class for "Event Type: SAVE" can modify the corresponding container of the parent application, such that the popup text will display "Data Submit read from Custom Example." In an embodiment, at runtime, the MAP framework builds (e.g., merges) the parent application metadata (e.g., from the EXAMPLE application) with that of the custom metadata of the custom application to generate the customized application. Additionally, the original EXAMPLE metadata is not affected such that if the project with the EXAMPLE metadata was re-imported it would have no effect to the customized metadata. The user (e.g., a developer) can add additional pages to the EXAMPLE application by adding pages via the customized layout. If the user wants to run the original parent application (e.g., the EXAMPLE application), the user can turn off the Custom changes by selecting the "No Custom" check box on the custom layout. For example, the user can via People Code based on context at runtime selectively decide in a piecemeal manner which container element(s) to use from either the original application (EXAMPLE) or the custom application.

As another example, the user has the option of calling the application class for the event of the parent application and running the customized event on top of running the parent event, or calling the customized application class with the customized event only. In this example, the user can unselect checkbox 950, if the user wants to call the application class for the event of the parent application and running the customized event on top of running the parent event. Further, the user can select checkbox 950, if the user wants to call the customized application class with the customized event only. In this latter example, no rendering objects of the parent application will be rendered at runtime, instead, only the rendering objects in the application class of the customized event will be rendered at runtime. For example, if the parent has business logic that the user would like to use in the customized events, the user can unselect checkbox 950. In this example, the parent application still runs, but once the parent runs, the parent event (e.g., the save event), the data structure associated with the container of the parent event is populated and included in the rendering object of the parent event. Before the rendering object renders, the user can modify the MAP object (e.g., change data, remove rows, change property values, etc.). In this case, the parent application's rendering object will be rendered at runtime, but with the values of the customized portions (e.g., with the custom event details 920). In another embodiment, the user can select checkbox 950 ("Custom event only"), so that the rendering object of the parent application is not rendered, but rather, only the application class of the customized event will be rendered at run time. For example, only the custom event would run, and not run the parent logic. It will be appreciated that the customizations are autonomous to the parent because the original parent metadata is unmodified when the parent event is modified in a customized application. Advantageously, upgrades or patches made to the parent application do not impact the customized application. As another advantage, the checkbox 950 is available for each container included in the customized application. For example, for each container in the custom application, the user can selectively run the custom event or the parent event. Further, when running the parent event with the customized metadata, the rendering object of the parent application can be changed to accomplish customization, and the parent application runs as is with the customized metadata. It will be appreciated that the customized metadata can be overridden on a container-by-container basis. For example, using the properties (e.g., properties link 830 of FIG. 8), the customized metadata of a container can be overridden, such that even of the associated checkbox 950 for the container is selected, the customized metadata would not be rendered at runtime, but rather the parent container building block would run. The ability to override customized metadata in the properties section of the containers can be performed on a piecemeal basis (e.g., on a container-by-container basis).

Figure 10:
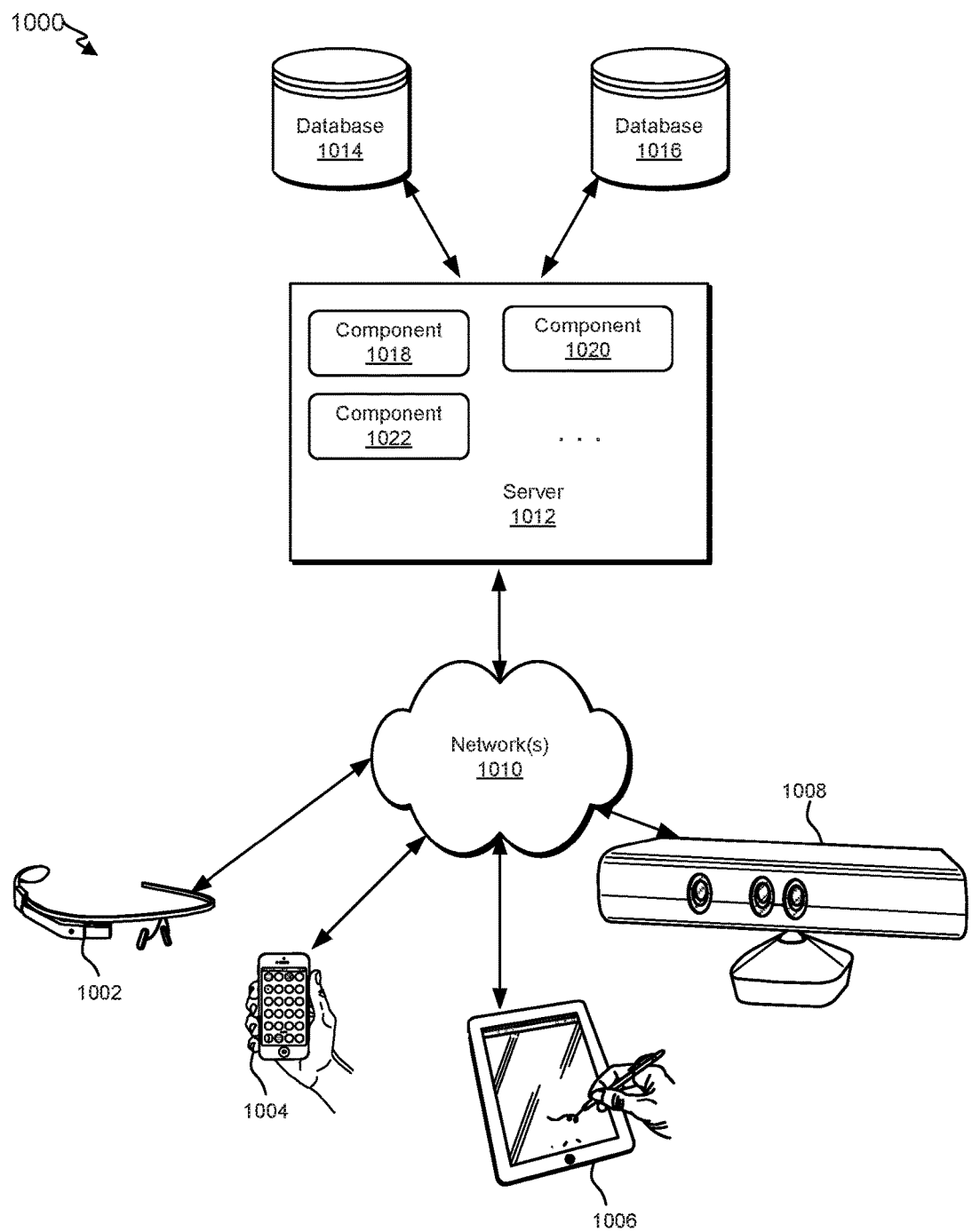
FIG. 10 depicts a simplified diagram of a distributed system for implementing one of the embodiments.

FIG. 10 depicts a simplified diagram of a distributed system 1000 for implementing one of the embodiments. In the illustrated embodiment, distributed system 1000 includes one or more client computing devices 1002, 1004, 1006, and 1008, which are configured to execute and operate a client application such as a web browser, proprietary client (e.g., Oracle Forms), or the like over one or more network(s) 1010. Server 1012 may be communicatively coupled with remote client computing devices 1002, 1004, 1006, and 1008 via network 1010.

In various embodiments, server 1012 may be adapted to run one or more services or software applications provided by one or more of the components of the system. In some embodiments, these services may be offered as web-based or cloud services or under a Software as a Service (SaaS) model to the users of client computing devices 1002, 1004, 1006, and/or 708. Users operating client computing devices 1002, 1004, 1006, and/or 1008 may in turn utilize one or more client applications to interact with server 1012 to utilize the services provided by these components.

In the configuration depicted in the figure, the software components 1018, 1020 and 1022 of system 1000 are shown as being implemented on server 1012. In other embodiments, one or more of the components of system 1000 and/or the services provided by these components may also be implemented by one or more of the client computing devices 1002, 1004, 1006, and/or 1008. Users operating the client computing devices may then utilize one or more client applications to use the services provided by these components. These components may be implemented in hardware, firmware, software, or combinations thereof. It should be appreciated that various different system configurations are possible, which may be different from distributed system 1000. The embodiment shown in the figure is thus one example of a distributed system for implementing an embodiment system and is not intended to be limiting.

Client computing devices 1002, 1004, 1006, and/or 1008 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 1002, 1004, 1006, and 1008 may be any other electronic device, such as a thin-client computer, an Internet-enabled gaming system (e.g., a Microsoft Xbox gaming console with or without a Kinect® gesture input device), and/or a personal messaging device, capable of communicating over network(s) 710.

Although exemplary distributed system 1000 is shown with four client computing devices, any number of client computing devices may be supported. Other devices, such as devices with sensors, etc., may interact with server 1012.

Network(s) 1010 in distributed system 1000 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 1010 can be a local area network (LAN), such as one based on Ethernet, Token-Ring and/or the like. Network(s) 1010 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 1012 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 1012 may be adapted to run one or more services or software applications described in the foregoing disclosure. For example, server 1012 may correspond to a server for performing processing described above according to an embodiment of the present disclosure.

Server 1012 may run an operating system including any of those discussed above, as well as any commercially available server operating system. Server 1012 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 1012 may include one or more applications to analyze and consolidate data feeds and/or event updates received from users of client computing devices 1002, 1004, 1006, and 1008. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1012 may also include one or more applications to display the data feeds and/or real-time events via one or more display devices of client computing devices 1002, 1004, 1006, and 1008.

Distributed system 1000 may also include one or more databases 1014 and 1016. Databases 1014 and 1016 may reside in a variety of locations. By way of example, one or more of databases 1014 and 1016 may reside on a non-transitory storage medium local to (and/or resident in) server 1012. Alternatively, databases 1014 and 1016 may be remote from server 1012 and in communication with server 1012 via a network-based or dedicated connection. In one set of embodiments, databases 1014 and 1016 may reside in a storage-area network (SAN). Similarly, any necessary files for performing the functions attributed to server 1012 may be stored locally on server 1012 and/or remotely, as appropriate. In one set of embodiments, databases 1014 and 1016 may include relational databases, such as databases provided by Oracle, that are adapted to store, update, and retrieve data in response to SQL-formatted commands.

Figure 11:
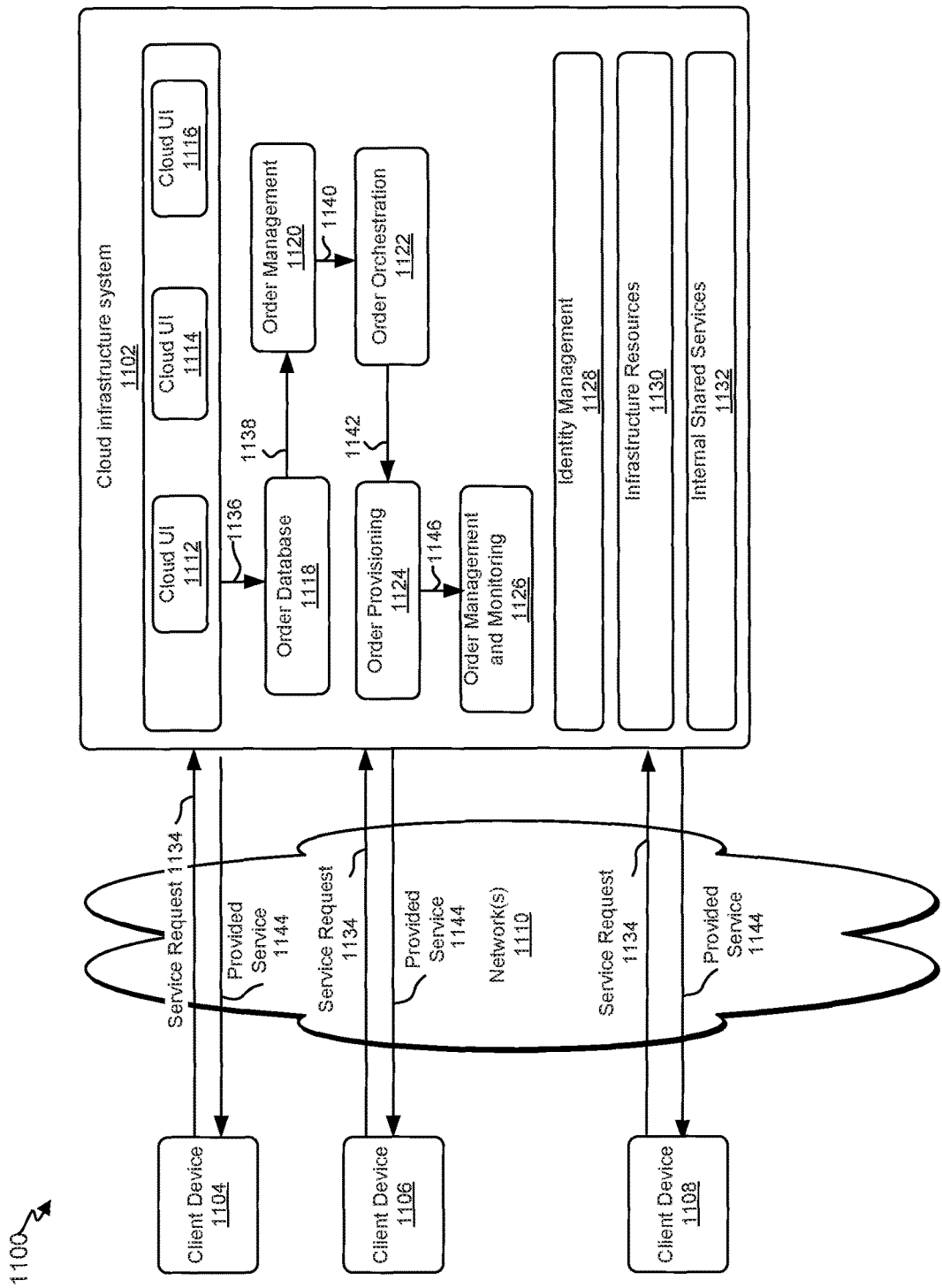
FIG. 11 is a simplified block diagram of components of a system environment by which services provided by the components of an embodiment system may be offered as cloud services, in accordance with an embodiment of the present disclosure.

FIG. 11 is a simplified block diagram of one or more components of a system environment 1100 by which services provided by one or more components of an embodiment system may be offered as cloud services, in accordance with an embodiment of the present disclosure. In the illustrated embodiment, system environment 1100 includes one or more client computing devices 1104, 1106, and 1108 that may be used by users to interact with a cloud infrastructure system 1102 that provides cloud services. The client computing devices may be configured to operate a client application such as a web browser, a proprietary client application (e.g., Oracle Forms), or some other application, which may be used by a user of the client computing device to interact with cloud infrastructure system 1102 to use services provided by cloud infrastructure system 1102.

It should be appreciated that cloud infrastructure system 1102 depicted in the figure may have other components than those depicted. Further, the embodiment shown in the figure is only one example of a cloud infrastructure system that may incorporate an embodiment of the invention. In some other embodiments, cloud infrastructure system 1102 may have more or fewer components than shown in the figure, may combine two or more components, or may have a different configuration or arrangement of components.

Client computing devices 1104, 1106, and 1108 may be devices similar to those described above for 1002, 1004, 1006, and 1008.

Although exemplary system environment 1100 is shown with three client computing devices, any number of client computing devices may be supported. Other devices such as devices with sensors, etc. may interact with cloud infrastructure system 1102.

Network(s) 1110 may facilitate communications and exchange of data between clients 1104, 1106, and 1108 and cloud infrastructure system 1102. Each network may be any type of network familiar to those skilled in the art that can support data communications using any of a variety of commercially-available protocols, including those described above for network(s) 1110.

Cloud infrastructure system 1102 may comprise one or more computers and/or servers that may include those described above for server 1012.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1102 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 1102 may be adapted to automatically provision, manage and track a customer's subscription to services offered by cloud infrastructure system 1102. Cloud infrastructure system 1102 may provide the cloud services via different deployment models. For example, services may be provided under a public cloud model in which cloud infrastructure system 1102 is owned by an organization selling cloud services (e.g., owned by Oracle) and the services are made available to the general public or different industry enterprises. As another example, services may be provided under a private cloud model in which cloud infrastructure system 1102 is operated solely for a single organization and may provide services for one or more entities within the organization. The cloud services may also be provided under a community cloud model in which cloud infrastructure system 1102 and the services provided by cloud infrastructure system 1102 are shared by several organizations in a related community. The cloud services may also be provided under a hybrid cloud model, which is a combination of two or more different models.

In some embodiments, the services provided by cloud infrastructure system 802 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1102. Cloud infrastructure system 1102 then performs processing to provide the services in the customer's subscription order.

In some embodiments, the services provided by cloud infrastructure system 802 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1102 may also include infrastructure resources 1130 for providing the resources used to provide various services to customers of the cloud infrastructure system. In one embodiment, infrastructure resources 1130 may include pre-integrated and optimized combinations of hardware, such as servers, storage, and networking resources to execute the services provided by the PaaS platform and the SaaS platform.

In some embodiments, resources in cloud infrastructure system 802 may be shared by multiple users and dynamically re-allocated per demand. Additionally, resources may be allocated to users in different time zones. For example, cloud infrastructure system 1130 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1132 may be provided that are shared by different components or modules of cloud infrastructure system 1102 and by the services provided by cloud infrastructure system 1102. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 802 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1102, and the like.

In one embodiment, as depicted in the figure, cloud management functionality may be provided by one or more modules, such as an order management module 1120, an order orchestration module 1122, an order provisioning module 1124, an order management and monitoring module 1126, and an identity management module 1128. These modules may include or be provided using one or more computers and/or servers, which may be general purpose computers, specialized server computers, server farms, server clusters, or any other appropriate arrangement and/or combination.

In exemplary operation 1134, a customer using a client device, such as client device 1104, 1106 or 1108, may interact with cloud infrastructure system 1102 by requesting one or more services provided by cloud infrastructure system 1102 and placing an order for a subscription for one or more services offered by cloud infrastructure system 1102. In certain embodiments, the customer may access a cloud User Interface (UI), cloud UI 1112, cloud UI 1114 and/or cloud UI 1116 and place a subscription order via these UIs. The order information received by cloud infrastructure system 1102 in response to the customer placing an order may include information identifying the customer and one or more services offered by the cloud infrastructure system 1102 that the customer intends to subscribe to.

After an order has been placed by the customer, the order information is received via the cloud UIs, 1112, 1114 and/or 1116.

At operation 1136, the order is stored in order database 1118. Order database 1118 can be one of several databases operated by cloud infrastructure system 1118 and operated in conjunction with other system elements.

At operation 1138, the order information is forwarded to an order management module 1120. In some instances, order management module 1120 may be configured to perform billing and accounting functions related to the order, such as verifying the order, and upon verification, booking the order.

At operation 1140, information regarding the order is communicated to an order orchestration module 1122. Order orchestration module 1122 may utilize the order information to orchestrate the provisioning of services and resources for the order placed by the customer. In some instances, order orchestration module 1122 may orchestrate the provisioning of resources to support the subscribed services using the services of order provisioning module 1124.

In certain embodiments, order orchestration module 1122 enables the management of business processes associated with each order and applies business logic to determine whether an order should proceed to provisioning. At operation 1142, upon receiving an order for a new subscription, order orchestration module 1122 sends a request to order provisioning module 1124 to allocate resources and configure those resources needed to fulfill the subscription order. Order provisioning module 1124 enables the allocation of resources for the services ordered by the customer. Order provisioning module 1124 provides a level of abstraction between the cloud services provided by cloud infrastructure system 1100 and the physical implementation layer that is used to provision the resources for providing the requested services. Order orchestration module 1122 may thus be isolated from implementation details, such as whether or not services and resources are actually provisioned on the fly or pre-provisioned and only allocated/assigned upon request.

At operation 1144, once the services and resources are provisioned, a notification of the provided service may be sent to customers on client devices 1104, 1106 and/or 1108 by order provisioning module 1124 of cloud infrastructure system 1102.

At operation 1146, the customer's subscription order may be managed and tracked by an order management and monitoring module 1126. In some instances, order management and monitoring module 1126 may be configured to collect usage statistics for the services in the subscription order, such as the amount of storage used, the amount data transferred, the number of users, and the amount of system up time and system down time.

In certain embodiments, cloud infrastructure system 1100 may include an identity management module 1128. Identity management module 1128 may be configured to provide identity services, such as access management and authorization services in cloud infrastructure system 1100. In some embodiments, identity management module 1128 may control information about customers who wish to utilize the services provided by cloud infrastructure system 1102. Such information can include information that authenticates the identities of such customers and information that describes which actions those customers are authorized to perform relative to various system resources (e.g., files, directories, applications, communication ports, memory segments, etc.) Identity management module 1128 may also include the management of descriptive information about each customer and about how and by whom that descriptive information can be accessed and modified.

Figure 12:
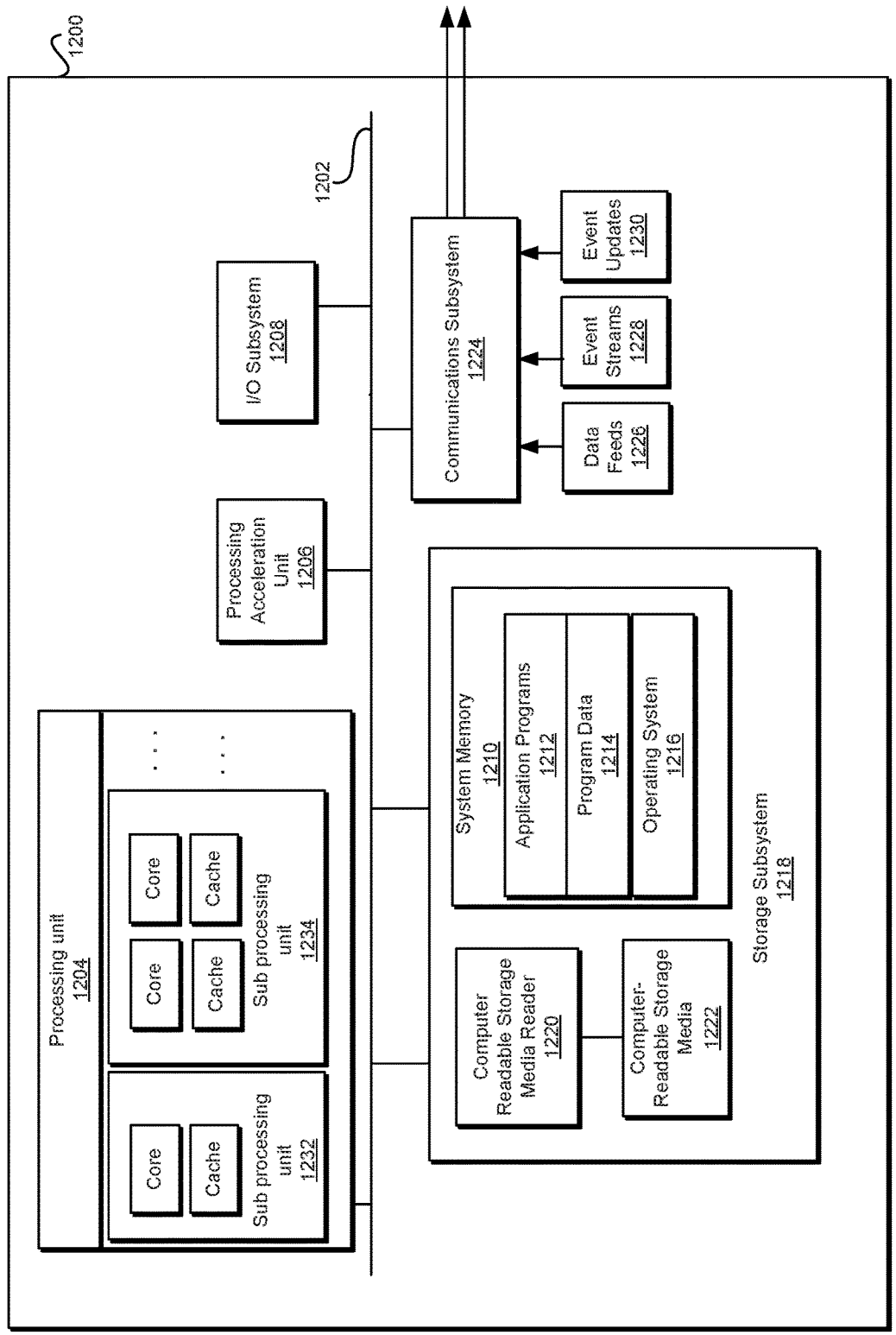
FIG. 12 illustrates an exemplary computer system, in which various embodiments of the present invention may be implemented.

FIG. 12 illustrates an exemplary computer system 1200, in which various embodiments of the present invention may be implemented. The system 1200 may be used to implement any of the computer systems described above. As shown in the figure, computer system 1200 includes a processing unit 1204 that communicates with a number of peripheral subsystems via a bus subsystem 1202. These peripheral subsystems may include a processing acceleration unit 1206, an I/O subsystem 1208, a storage subsystem 1218 and a communications subsystem 1224. Storage subsystem 1218 includes tangible computer-readable storage media 1222 and a system memory 1210.

Bus subsystem 1202 provides a mechanism for letting the various components and subsystems of computer system 1200 communicate with each other as intended. Although bus subsystem 1202 is shown schematically as a single bus, alternative embodiments of the bus subsystem may utilize multiple buses. Bus subsystem 1202 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1204, which can be implemented as one or more integrated circuits (e.g., a conventional microprocessor or microcontroller), controls the operation of computer system 1200. One or more processors may be included in processing unit 1204. These processors may include single core or multicore processors. In certain embodiments, processing unit 1204 may be implemented as one or more independent processing units 1232 and/or 1234 with single or multicore processors included in each processing unit. In other embodiments, processing unit 1204 may also be implemented as a quad-core processing unit formed by integrating two dual-core processors into a single chip.

In various embodiments, processing unit 1204 can execute a variety of programs in response to program code and can maintain multiple concurrently executing programs or processes. At any given time, some or all of the program code to be executed can be resident in processor(s) 1204 and/or in storage subsystem 1218. Through suitable programming, processor(s) 1204 can provide various functionalities described above. Computer system 1200 may additionally include a processing acceleration unit 1206, which can include a digital signal processor (DSP), a special-purpose processor, and/or the like.

I/O subsystem 1208 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1200 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1200 may comprise a storage subsystem 1218 that comprises software elements, shown as being currently located within a system memory 1210. System memory 1210 may store program instructions that are loadable and executable on processing unit 1204, as well as data generated during the execution of these programs.

Depending on the configuration and type of computer system 1200, system memory 1210 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1204. In some implementations, system memory 1210 may include multiple different types of memory, such as static random access memory (SRAM) or dynamic random access memory (DRAM). In some implementations, a basic input/output system (BIOS), containing the basic routines that help to transfer information between elements within computer system 1200, such as during start-up, may typically be stored in the ROM. By way of example, and not limitation, system memory 1210 also illustrates application programs 1212, which may include client applications, Web browsers, mid-tier applications, relational database management systems (RDBMS), etc., program data 1214, and an operating system 1216. By way of example, operating system 1216 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1218 may also provide a tangible computer-readable storage medium for storing the basic programming and data constructs that provide the functionality of some embodiments. Software (programs, code modules, instructions) that when executed by a processor provide the functionality described above may be stored in storage subsystem 1218. These software modules or instructions may be executed by processing unit 1204. Storage subsystem 1218 may also provide a repository for storing data used in accordance with the present invention.

Storage subsystem 1200 may also include a computer-readable storage media reader 1220 that can further be connected to computer-readable storage media 1222. Together and, optionally, in combination with system memory 1210, computer-readable storage media 1222 may comprehensively represent remote, local, fixed, and/or removable storage devices plus storage media for temporarily and/or more permanently containing, storing, transmitting, and retrieving computer-readable information.

Computer-readable storage media 1222 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1200.

By way of example, computer-readable storage media 1222 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1222 may include, but is not limited to, Zip® drives, flash memory cards, universal serial bus (USB) flash drives, secure digital (SD) cards, DVD disks, digital video tape, and the like. Computer-readable storage media 1222 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1200.

Communications subsystem 1224 provides an interface to other computer systems and networks. Communications subsystem 1224 serves as an interface for receiving data from and transmitting data to other systems from computer system 1200. For example, communications subsystem 1224 may enable computer system 1200 to connect to one or more devices via the Internet. In some embodiments communications subsystem 1224 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1224 can provide wired network connectivity (e.g., Ethernet) in addition to or instead of a wireless interface.

In some embodiments, communications subsystem 1224 may also receive input communication in the form of structured and/or unstructured data feeds 1226, event streams 1228, event updates 1230, and the like on behalf of one or more users who may use computer system 1200.

By way of example, communications subsystem 1224 may be configured to receive data feeds 1226 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1224 may also be configured to receive data in the form of continuous data streams, which may include event streams 1228 of real-time events and/or event updates 1230, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1224 may also be configured to output the structured and/or unstructured data feeds 1226, event streams 1228, event updates 1230, and the like to one or more databases that may be in communication with one or more streaming data source computers coupled to computer system 1200.

Computer system 1200 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1200 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method comprising:
    providing an interface configured to enable a user to build an application, wherein building the application includes linking building blocks, and wherein the building blocks are configured to process data from data structures;
    receiving, via the interface, first input corresponding to a request to build a new building block;
    building the new building block by:
        defining one or more open input/output (I/O) features to the new building block, wherein the one or more open I/O features comprise one or more unassigned inputs to the new building block or one or more unassigned outputs from the new building block, wherein the one or more unassigned inputs define a first type of input to be inputted into the new building block, and wherein the one or more unassigned outputs define a second type of output to be outputted from the new building block;
        accessing a plurality of existing building blocks, wherein each existing building block of the plurality of existing building blocks corresponds to a data structure comprising one or more external I/O features, and wherein each external I/O feature of the one or more external I/O features includes an input defined for storage in the data structure or an output defined for retrieval from the data structure;
        generating a menu object that facilitates a selection of one or more existing building blocks from amongst the plurality of existing building blocks, wherein an identifier of each of the one or more existing building blocks is displayed when the menu object is selected;
        receiving second input corresponding to a selection, identified using the menu object, of a particular existing building block of the plurality of existing building blocks;
        receiving third input corresponding to a selection of a particular external I/O feature of the particular existing building block to link to a particular open I/O feature of the new building block;
        assigning the particular external I/O feature of the particular existing building block to the particular open I/O feature of the new building block, wherein assigning includes storing assignment metadata in association with the new building block, wherein the assignment metadata indicates a link from the particular external I/O feature to the particular open I/O feature, and wherein the link represents an input of the particular existing building block being mapped to an output of the new building block or an output of the particular existing building block being mapped to an input of the new building block; and
        storing a definition of the new building block, wherein the definition comprises the one or more open I/O features and the assignment metadata, and wherein storing the definition of the new building block causes a new identifier corresponding to the new building block to be available for selection using the menu object, wherein the new building block becomes available for selection as an existing building block using the menu object,
    wherein the menu object, in response to being selected, is configured to display a list of the plurality of existing building blocks, the list being generated to include a collection of building blocks and/or corresponding assignment metadata of the building blocks that are available at a time the menu object is selected.

2. The computer-implemented method of claim 1, wherein the menu object corresponds to a drop down list, a search field with predictive text, a flyout menu, a dropline menu, and an accordion menu, or any combination thereof.

3. The computer-implemented method of claim 1, further comprising:
    identifying a type of an output of a first building block;
    identifying a type of an input of a second building block; and
    performing a data truncation test to determine whether the type of the output of the first building block is compatible with the type of the input of the second building block, and the data truncation test determining whether a transformation of data from the type of the output of the first building block to the type of the input of the second building block truncates the data.

4. The computer-implemented method of claim 3, wherein when the data truncation test indicates that a transformation truncates the data, then performing the data truncation test further comprises:
    identifying one or more virtual transformation building blocks that are configured to transform input data from a first data type to a second data type, the transformation of the input data from the first data type to the second data type not resulting in truncation of the input data; and
    combining the one or more virtual transformation building blocks with the output of the first building block or the input of the second building block.

5. The computer-implemented method of claim 3, wherein when the data truncation test indicates that a transformation does not truncate the data, the output of the first building block is linked to the input of the second building block using the assignment metadata, and an indication of the link is stored in the assignment metadata.

6. A system, comprising:
    one or more data processors; and
    a non-transitory computer-readable storage medium containing instructions which, when executed on the one or more data processors, cause the one or more data processors to perform operations including:
        providing an interface configured to enable a user to build an application, wherein building the application includes linking building blocks, and wherein the building blocks are configured to process data from data structures;
        receiving, via the interface, first input corresponding to a request to build a new building block;
        building the new building block by:
            defining one or more open input/output (I/O) features to the new building block, wherein the one or more open I/O features comprise one or more unassigned inputs to the new building block or one or more unassigned outputs from the new building block, wherein the one or more unassigned inputs define a first type of input to be inputted into the new building block, and wherein the one or more unassigned outputs define a second type of output to be outputted from the new building block;

accessing a plurality of existing building blocks, wherein each existing building block of the plurality of existing building blocks corresponds to a data structure comprising one or more external I/O features, and wherein each external I/O feature of the one or more external I/O features includes an input defined for storage in the data structure or an output defined for retrieval from the data structure;

generating a menu object that facilitates a selection of one or more existing building blocks from amongst the plurality of existing building blocks, wherein an identifier of each of the one or more existing building blocks is displayed when the menu object is selected;

receiving second input corresponding to a selection, identified using the menu object, of a particular existing building block of the plurality of existing building blocks;

receiving third input corresponding to a selection of a particular external I/O feature of the particular existing building block to link to a particular open I/O feature of the new building block;

assigning the particular external I/O feature of the particular existing building block to the particular open I/O feature of the new building block, wherein assigning includes storing assignment metadata in association with the new building block, wherein the assignment metadata indicates a link from the particular external I/O feature to the particular open I/O feature, and wherein the link represents an input of the particular existing building block being mapped to an output of the new building block or an output of the particular existing building block being mapped to an input of the new building block; and storing a definition of the new building block, wherein the definition comprises the one or more open I/O features and the assignment metadata, and wherein storing the definition of the new building block causes a new identifier corresponding to the new building block to be available for selection using the menu object, wherein the new building block becomes available for selection as an existing building block using the menu object;

wherein the menu object, in response to being selected, is configured to display a list of the plurality of existing building blocks, the list being generated to include a collection of building blocks and/or corresponding assignment metadata of the building blocks that are available at a time the menu object is selected.

7. The system of claim 6, wherein the menu object corresponds to a drop down list, a search field with predictive text, a flyout menu, a dropline menu, and an accordion menu, or any combination thereof.

8. The system of claim 6, further comprising:
identifying a type of an output of a first building block;
identifying a type of an input of a second building block; and
performing a data truncation test to determine whether the type of the output of the first building block is compatible with the type of the input of the second building block, and the data truncation test determining whether a transformation of data from the type of the output of the first building block to the type of the input of the second building block truncates the data.

9. The system of claim 8, wherein when the data truncation test indicates that a transformation truncates the data, then performing the data truncation test further comprises:
identifying one or more virtual transformation building blocks that are configured to transform input data from a first data type to a second data type, the transformation of the input data from the first data type to the second data type not resulting in truncation of the input data; and
combining the one or more virtual transformation building blocks with the output of the first building block or the input of the second building block.

10. The system of claim 8, wherein when the data truncation test indicates that a transformation does not truncate the data, the output of the first building block is linked to the input of the second building block using the assignment metadata, and an indication of the link is stored in the assignment metadata.

11. A computer-program product tangibly embodied in a non-transitory machine-readable storage medium, including instructions configured to cause a data processing apparatus to perform operations including:
providing an interface configured to enable a user to build an application, wherein building the application includes linking building blocks, and wherein the building blocks are configured to process data from data structures;
receiving, via the interface, first input corresponding to a request to build a new building block;
building the new building block by:
defining one or more open input/output (I/O) features to the new building block, wherein the one or more open I/O features comprise one or more unassigned inputs to the new building block or one or more unassigned outputs from the new building block, wherein the one or more unassigned inputs define a first type of input to be inputted into the new building block, and wherein the one or more unassigned outputs define a second type of output to be outputted from the new building block;
accessing a plurality of existing building blocks, wherein each existing building block of the plurality of existing building blocks corresponds to a data structure comprising one or more external I/O features, and wherein each external I/O feature of the one or more external I/O features includes an input defined for storage in the data structure or an output defined for retrieval from the data structure;
generating a menu object that facilitates a selection of one or more existing building blocks from amongst the plurality of existing building blocks, wherein an identifier of each of the one or more existing building blocks is displayed when the menu object is selected;
receiving second input corresponding to a selection, identified using the menu object, of a particular existing building block of the plurality of existing building blocks;
receiving third input corresponding to a selection of a particular external I/O feature of the particular existing building block to link to a particular open I/O feature of the new building block;

assigning the particular external I/O feature of the particular existing building block to the particular open I/O feature of the new building block, wherein assigning includes storing assignment metadata in association with the new building block, wherein the assignment metadata indicates a link from the particular external I/O feature to the particular open I/O feature, and wherein the link represents either an input of the particular existing building block being mapped to an output of the new building block or an output of the particular existing building block being mapped to an input of the new building block; and storing a definition of the new building block, and wherein the definition comprises the one or more open I/O features and the assignment metadata, and wherein storing the definition of the new building block causes a new identifier corresponding to the new building block to be available for selection using the menu object, wherein the new building block becomes available for selection as an existing building block using the menu object, wherein the menu object, in response to being selected, is configured to display a list of the plurality of existing building blocks, the list being generated to include a collection of building blocks and/or corresponding assignment metadata of the building blocks that are available at a time the menu object is selected.

12. The computer-program product of claim 11, wherein the menu object corresponds to a drop down list, a search field with predictive text, a flyout menu, a dropline menu, and an accordion menu, or any combination thereof.

13. The computer-program product of claim 11, further comprising:

identifying a type of an output of a first building block;

identifying a type of an input of a second building block; and performing a data truncation test to determine whether the type of the output of the first building block is compatible with the type of the input of the second building block, and the data truncation test determining whether a transformation of data from the type of the output of the first building block to the type of the input of the second building block truncates the data.

14. The computer-program product of claim 13, wherein when the data truncation test indicates that a transformation truncates the data, then performing the data truncation test further comprises:

identifying one or more virtual transformation building blocks that are configured to transform input data from a first data type to a second data type, the transformation of the input data from the first data type to the second data type not resulting in truncation of the input data; and combining the one or more virtual transformation building blocks with the output of the first building block or the input of the second building block.

15. The computer-program product of claim 13, wherein when the data truncation test indicates that a transformation does not truncate the data, the output of the first building block is linked to the input of the second building block using the assignment metadata, and an indication of the link is stored in the assignment metadata.

* * * * *

UNITED STATES PATENT AND TRADEMARK OFFICE
CERTIFICATE OF CORRECTION

PATENT NO. : 10,180,823 B2  
APPLICATION NO. : 15/399560  
DATED : January 15, 2019  
INVENTOR(S) : Collins Page 1 of 1

It is certified that error appears in the above-identified patent and that said Letters Patent is hereby corrected as shown below:

In the Specification

In Column 19, Line 60, delete "that that" and insert -- that --, therefor.

In Column 20, Line 15, delete "that that" and insert -- that --, therefor.

In the Claims

In Column 37, Line 52, in Claim 6, delete "object;" and insert -- object, --, therefor.

Signed and Sealed this  
Seventh Day of January, 2020

Andrei Iancu  
*Director of the United States Patent and Trademark Office*